United States Patent
Angermayer et al.

(10) Patent No.: US 10,546,446 B2
(45) Date of Patent: Jan. 28, 2020

(54) THREE-DIMENSIONAL DISPLAY FOR WAGERING GAMING SYSTEMS WITH DISTORTION COMPENSATION

(71) Applicant: IGT Canada Solutions ULC, Moncton (CA)

(72) Inventors: Lukas Angermayer, Graz (AT); Stefan Mitterhoefer, Graz (AT); Stefan Keilwert, St. Josef (AT)

(73) Assignee: IGT Canada Solutions ULC, Moncton (CA)

( * ) Notice: Subject to any disclaimer, the term of this patent is extended or adjusted under 35 U.S.C. 154(b) by 815 days.

(21) Appl. No.: 14/949,599

(22) Filed: Nov. 23, 2015

(65) Prior Publication Data

US 2017/0148250 A1    May 25, 2017

(51) Int. Cl.
*A63F 13/00*        (2014.01)
*G07F 17/32*        (2006.01)
*G06T 17/20*        (2006.01)
*G06T 15/20*        (2011.01)
*G06T 19/20*        (2011.01)

(52) U.S. Cl.
CPC .......... *G07F 17/3211* (2013.01); *G06T 15/20* (2013.01); *G06T 17/20* (2013.01); *G06T 19/20* (2013.01); *G07F 17/3209* (2013.01); *G07F 17/3225* (2013.01); *G07F 17/3246* (2013.01); *G07F 17/3251* (2013.01); *G06T 2219/2021* (2013.01)

(58) Field of Classification Search
CPC ............. G07F 17/3211; G07F 17/3209; G07F 17/3225; G07F 17/3246; G07F 17/3251; G06T 17/20

USPC .......................................................... 348/51
See application file for complete search history.

(56) References Cited

U.S. PATENT DOCUMENTS

| | | | |
|---|---|---|---|
| 6,155,926 A * | 12/2000 | Miyamoto | A63F 13/02 463/32 |
| 8,888,589 B2 * | 11/2014 | Brunet de Courssou | G07F 17/3209 463/16 |
| 2016/0005263 A1 * | 1/2016 | Keilwert | G07F 17/3211 463/33 |

* cited by examiner

*Primary Examiner* — Omkar A Deodhar
*Assistant Examiner* — Eric M Thomas
(74) *Attorney, Agent, or Firm* — Sage Patent Group

(57) ABSTRACT

A wagering gaming apparatus is provided, comprising a 3-dimensional (3D) display device configured to create for a player a visual illusion of a 3D scene for a wagering game, the 3D scene having perceived depth in a z-direction perpendicular to a physical screen having width in an x-direction and height in a y-direction; at least one processor; and at least one non-transitory processor-readable storage medium storing processor-executable instructions. The instructions may cause the at least one processor to generate the 3D scene as a view from a virtual 3D camera toward an origin position in a virtual 3D model, including defining a virtual game component as an object mesh in the virtual 3D model, the virtual game component having a designated front perspective view. The object mesh may be warped to maintain the designated front perspective view of the virtual game component in the view from the virtual 3D camera.

16 Claims, 17 Drawing Sheets

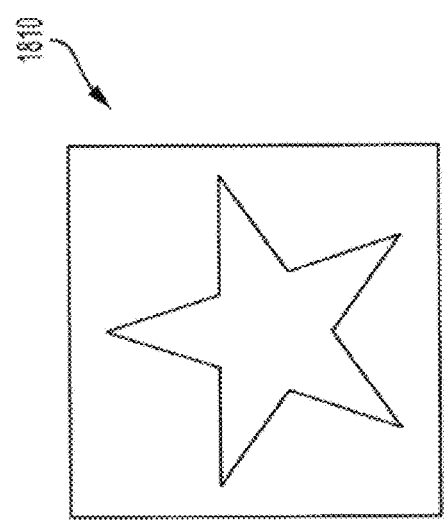
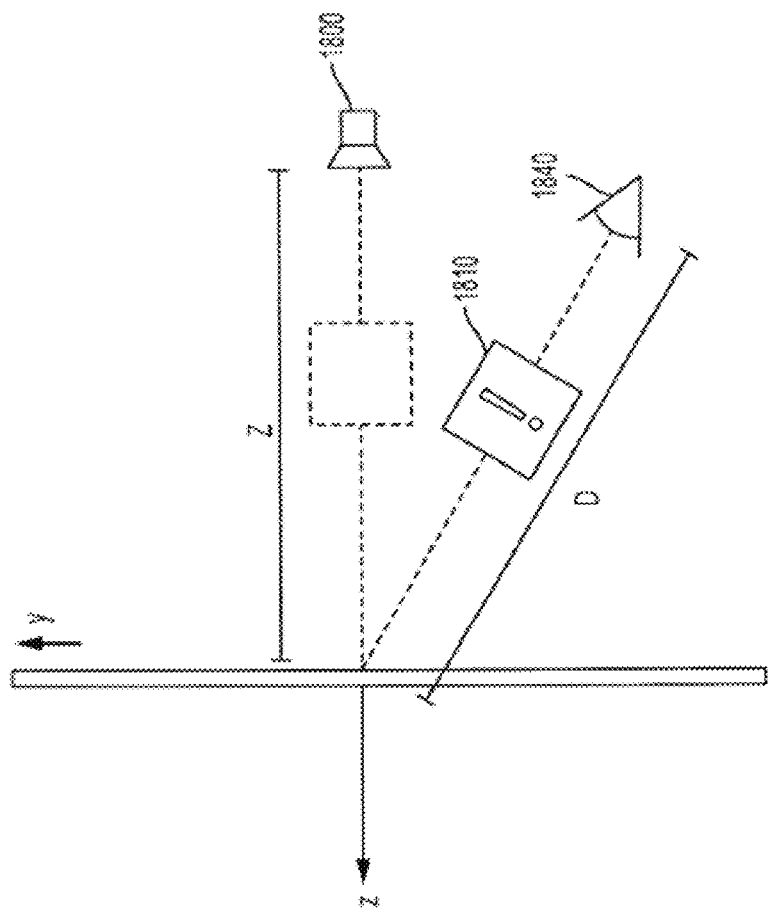
FIG. 10B
FIG. 10A

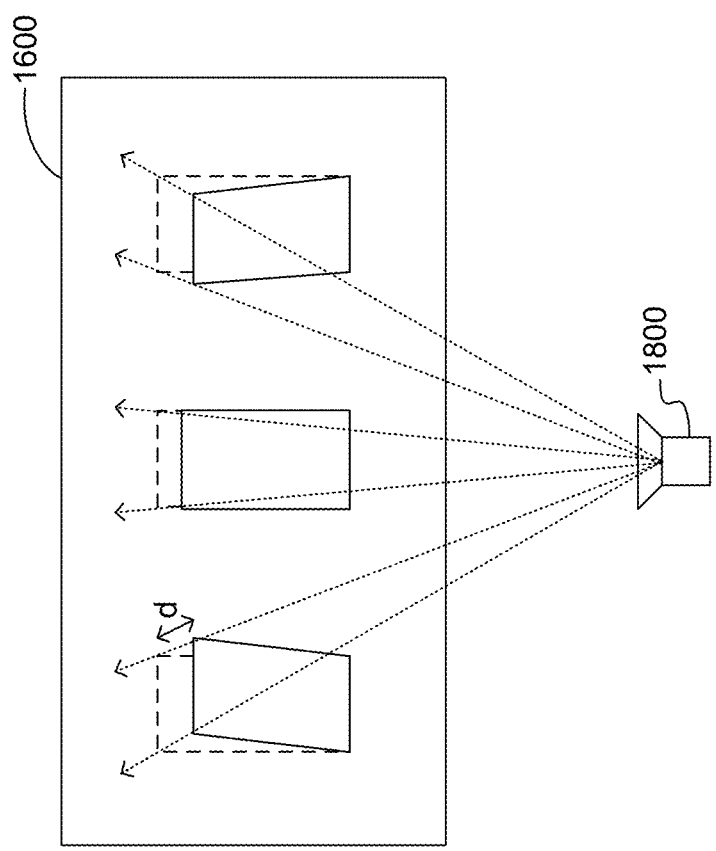

THREE-DIMENSIONAL DISPLAY FOR WAGERING GAMING SYSTEMS WITH DISTORTION COMPENSATION

BACKGROUND

The present disclosure relates to the field of electronic wagering gaming systems, such as on-line gaming and gaming systems in casinos.

Examples of gaming systems or machines include slot machines, online gaming systems (e.g., systems that enable users to play games using computer devices such as desktop computers, laptops, tablet computers, smart phones, other mobile devices, etc.), computer programs for use on a computer device, gaming consoles that are connectable to a display such as a television, a computer screen, etc.

Gaming machines may be configured to enable users to play different types of games. For example, some games display a plurality of game components that are moving (e.g., symbols on spinning reels). The game components may be arranged in an array of cells, where each cell may include a game component. One or more particular combinations or patterns of game components in such an arrangement may be designated as "winning combinations" or "winning patterns." Games that are based on winning patterns are referred to as "pattern games" in this disclosure.

One example of a pattern game is a game that includes spinning reels arranged in an array, where each reel may have a plurality of game components that come into view successively as the reel spins. A user may wager on one or more lines in the array and activate the game (e.g., by pushing a button). After the user activates the game, the spinning reels may be stopped to reveal a pattern of game components. The game rules may define one or more winning patterns, which may be associated with different numbers or combinations of credits, points, etc.

Other examples of games include card games such as poker, blackjack, gin rummy, etc., where game components (e.g., cards) may be arranged in groups to form the layout of a game (e.g., the cards that form a player's hand, the cards that form a dealer's hand, cards that are drawn to further advance the game, etc.). As another example, in a traditional Bingo game, the game components may include the numbers printed on a 5×5 matrix which the players must match against drawn numbers. The drawn numbers may also be game components.

SUMMARY

Systems, methods and apparatus are provided for three-dimensional (3D) display for gaming systems.

One type of embodiment is directed to a wagering gaming apparatus comprising a 3-dimensional (3D) display device configured to create for a player a visual illusion of a 3D scene for a wagering game, the 3D scene having perceived depth in a z-direction perpendicular to a physical screen having width in an x-direction and height in a y-direction; at least one processor; and at least one non-transitory processor-readable storage medium storing processor-executable instructions that, when executed by the at least one processor, cause the at least one processor to perform: initializing the 3D scene as a view from a virtual 3D camera toward an origin position in a virtual 3D model wherein the direction from the virtual 3D camera toward the origin position defines the z-direction in the virtual 3D model; defining a virtual game component as an object mesh in the virtual 3D model, defining a set of points on the object mesh, defining a reference plane proximate to the object mesh and generally perpendicular to the z-direction in the virtual 3D model, and defining a reference viewpoint proximate to the virtual 3D camera; for each point in the defined set of points on the object mesh, determining a nearest point on the reference plane and a distance from the point on the object mesh to the nearest point on the reference plane, defining a linear viewing ray connecting the reference viewpoint and the nearest point on the reference plane, and warping the object mesh by moving the point on the object mesh to a location on the viewing ray while maintaining the distance from the point on the object mesh to the nearest point on the reference plane; generating an equalized 3D scene including the virtual game component with the warped object mesh; and displaying the equalized 3D scene via the 3D display device.

Another type of embodiment is directed to a method in a wagering gaming system comprising a 3-dimensional (3D) display device configured to create for a player a visual illusion of a 3D scene for a wagering game, the 3D scene having perceived depth in a z-direction perpendicular to a physical screen having width in an x-direction and height in a y-direction, the method comprising: initializing the 3D scene as a view from a virtual 3D camera toward an origin position in a virtual 3D model wherein the direction from the virtual 3D camera toward the origin position defines the z-direction in the virtual 3D model; defining a virtual game component as an object mesh in the virtual 3D model, defining a set of points on the object mesh, defining a reference plane proximate to the object mesh and generally perpendicular to the z-direction in the virtual 3D model, and defining a reference viewpoint proximate to the virtual 3D camera; for each point in the defined set of points on the object mesh, determining a nearest point on the reference plane and a distance from the point on the object mesh to the nearest point on the reference plane, defining a linear viewing ray connecting the reference viewpoint and the nearest point on the reference plane, and warping the object mesh by moving the point on the object mesh to a location on the viewing ray while maintaining the distance from the point on the object mesh to the nearest point on the reference plane; generating an equalized 3D scene including the virtual game component with the warped object mesh; and displaying the equalized 3D scene via the 3D display device.

Another type of embodiment is directed to at least one processor-readable storage medium storing processor-executable instructions that, when executed, perform a method in a wagering gaming system comprising a 3-dimensional (3D) display device configured to create for a player a visual illusion of a 3D scene for a wagering game, the 3D scene having perceived depth in a z-direction perpendicular to a physical screen having width in an x-direction and height in a y-direction, the method comprising: initializing the 3D scene as a view from a virtual 3D camera toward an origin position in a virtual 3D model wherein the direction from the virtual 3D camera toward the origin position defines the z-direction in the virtual 3D model; defining a virtual game component as an object mesh in the virtual 3D model, defining a set of points on the object mesh, defining a reference plane proximate to the object mesh and generally perpendicular to the z-direction in the virtual 3D model, and defining a reference viewpoint proximate to the virtual 3D camera; for each point in the defined set of points on the object mesh, determining a nearest point on the reference plane and a distance from the point on the object mesh to the nearest point on the reference plane, defining a linear viewing ray connecting the reference viewpoint and the nearest point on the reference plane, and warping the object mesh by moving the point on the object mesh to a location on the viewing ray while maintaining the distance from the point on the object mesh to the nearest point on the reference plane; generating an equalized 3D scene including the virtual game component with the warped object mesh; and displaying the equalized 3D scene via the 3D display device.

Another type of embodiment is directed to a wagering gaming apparatus comprising a 3-dimensional (3D) display device configured to create for a player a visual illusion of a 3D scene for a wagering game, the 3D scene having perceived depth in a z-direction perpendicular to a physical screen having width in an x-direction and height in a y-direction; at least one processor; and at least one non-transitory processor-readable storage medium storing processor-executable instructions that, when executed by the at least one processor, cause the at least one processor to perform: generating the 3D scene as a view from a virtual 3D camera toward an origin position in a virtual 3D model, including defining a virtual game component as an object mesh in the virtual 3D model, the virtual game component having a designated front perspective view; displaying the generated 3D scene via the 3D display device; in response to movement of the player in front of the physical screen, adjusting the 3D scene by moving the virtual 3D camera within the virtual 3D model; and maintaining the designated front perspective view of the virtual game component in the view from the virtual 3D camera by warping the object mesh in conjunction with moving the virtual 3D camera.

Another type of embodiment is directed to a method in a wagering gaming system comprising a 3-dimensional (3D) display device configured to create for a player a visual illusion of a 3D scene for a wagering game, the 3D scene having perceived depth in a z-direction perpendicular to a physical screen having width in an x-direction and height in a y-direction, the method comprising: generating the 3D scene as a view from a virtual 3D camera toward an origin position in a virtual 3D model, including defining a virtual game component as an object mesh in the virtual 3D model, the virtual game component having a designated front perspective view; displaying the generated 3D scene via the 3D display device; in response to movement of the player in front of the physical screen, adjusting the 3D scene by moving the virtual 3D camera within the virtual 3D model; and maintaining the designated front perspective view of the virtual game component in the view from the virtual 3D camera by warping the object mesh in conjunction with moving the virtual 3D camera.

Another type of embodiment is directed to at least one processor-readable storage medium storing processor-executable instructions that, when executed, perform a method in a wagering gaming system comprising a 3-dimensional (3D) display device configured to create for a player a visual illusion of a 3D scene for a wagering game, the 3D scene having perceived depth in a z-direction perpendicular to a physical screen having width in an x-direction and height in a y-direction, the method comprising: generating the 3D scene as a view from a virtual 3D camera toward an origin position in a virtual 3D model, including defining a virtual game component as an object mesh in the virtual 3D model, the virtual game component having a designated front perspective view; displaying the generated 3D scene via the 3D display device; in response to movement of the player in front of the physical screen, adjusting the 3D scene by moving the virtual 3D camera within the virtual 3D model; and maintaining the designated front perspective view of the virtual game component in the view from the virtual 3D camera by warping the object mesh in conjunction with moving the virtual 3D camera.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

FIG. 10A is a side view of an exemplary physical 3D display of a 3D scene that may be created by a gaming system, in accordance with some embodiments.

FIG. 10B illustrates an exemplary 3D view of a virtual game component that may be created by a gaming system, in accordance with some embodiments.

FIGS. 16A-E illustrate an example of 3D display and distortion compensation for a wagering game, in accordance with some embodiments.

DETAILED DESCRIPTION

Figure 1:
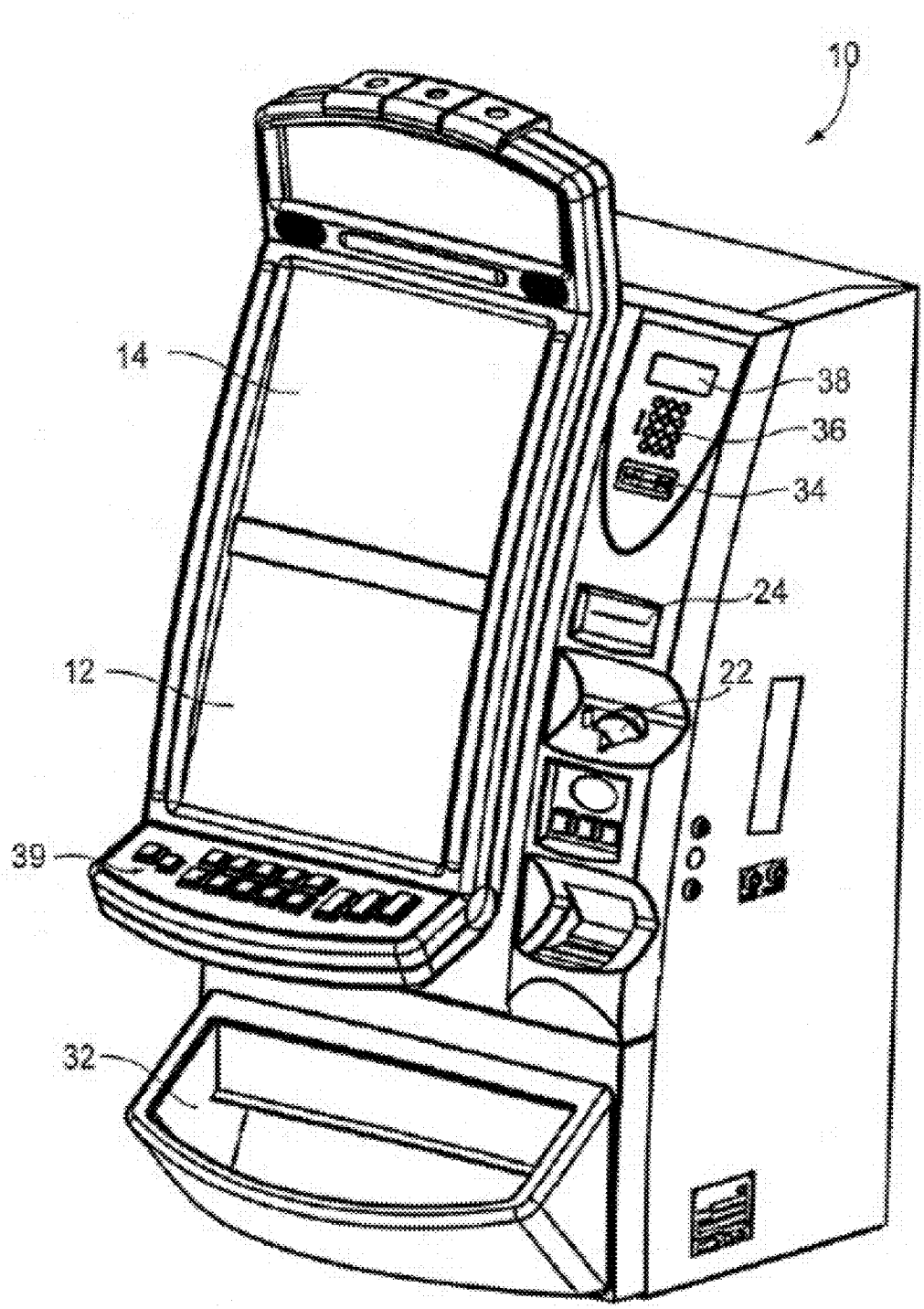
FIG. 1 is a perspective view of an illustrative electronic gaming machine (EGM) where a 3D display may be provided, in accordance with some embodiments.

Techniques described herein relate to distortion compensation in three-dimensional (3D) display for wagering gaming systems.

The inventors have appreciated that three-dimensional displays facilitate three-dimensional visualization of a displayed environment by providing visual information that may be used to understand the three-dimensional attributes of the environment, including some visual information not provided by a conventional, two-dimensional image of the environment. For example, the inventors have recognized that a 2D image of an environment does not permit a viewer to see different views of the environment from each eye ("stereo parallax") or to see different views of the environment from different viewpoints ("movement parallax"), and therefor hampers a viewer's ability to perceive the environment three-dimensionally. By contrast, a 3D image may provide stereo parallax, such that the viewer's left eye may see a view of the displayed environment from a first viewpoint, and the viewer's right eye may see a view of the displayed environment from a second viewpoint. Some 3D images may provide movement parallax, such that the viewer's eyes may see the displayed environment from different viewpoints as the viewer's head and/or eyes move in relation to the 3D image or in relation to some other point of reference.

Different types of 3D display technology are known, including stereoscopic and true 3D displays. Stereoscopic displays present different 2D views of a displayed environment to the viewer's left and right eyes, thereby providing the viewer with stereo parallax information about the environment. Some stereoscopic displays require the viewer to use eyewear (e.g., shutter glasses, polarization glasses, etc.) adapted to present one view of the displayed environment to the viewer's left eye and another view of the displayed environment to the viewer's right eye. By contrast, autostereoscopic displays present different views of an environment to the viewer's left and right eyes without requiring the viewer to use eyewear. For example, an autostereoscopic display may use a parallax barrier or a lenticular lens to divide the display's pixels into a first set of pixels visible to the viewer's left eye and a second set of pixels visible to the viewer's right eye, with the first set of pixels displaying a view of an environment from a first viewpoint, and the second set of pixels displaying a view of the environment from a second viewpoint. Some autostereoscopic displays use head-tracking and/or eye-tracking to locate the viewer's head and/or eyes and to adjust the display so that the views of the environment are continually directed to the viewer's eyes even as the viewer's head moves. An overview of autostereoscopic display technology is given by N. A. Dodgson in Autostereoscopic 3D Displays, IEEE Computer (August 2005), pp. 31-36.

In contrast to stereoscopic displays, which use 2D images to generate stereo parallax, true 3D displays actually display an image in three full dimensions. Examples of true 3D display technology include holographic displays, volumetric displays, integral imaging arrays, and compressive light field displays.

In some embodiments, as described further below, the 3D scene presented to the player via the 3D display device of a wagering gaming apparatus may be generated from a virtual 3D model constructed as data in memory by one or more processors of a wagering gaming apparatus. For example, the virtual 3D model may represent a virtual 3D space with various virtual objects occupying positions in the space, such as objects representing game components (e.g., cards, chips, playing pieces, reels, symbols, levers, buttons, machines, boards, backgrounds, designs, shapes, logos, messages, etc.). The virtual objects may be represented as data in any suitable format. In some embodiments, a virtual object may be represented as a mesh of points suitable to define the shape of the virtual object in the virtual space. In some embodiments, a virtual object may be represented as a set of surfaces that define the shape of the virtual object (e.g., six square planar surfaces to define a cube), in which case the surfaces may be defined by meshes of points that define the surface, and/or in any other suitable way. In some embodiments, one or more textures may be applied to one or more surfaces of a virtual 3D object, as is known in the field of 3D graphics, to define how the object will appear in the 3D scene. For example, a texture may be applied to a surface of a virtual 3D cube to make that surface appear a particular color, have a particular design on it, appear to be made of a particular material, and/or have other visual properties. In some cases, a texture applied to a planar or non-planar surface of a virtual 3D object may include a 2D image such as a photograph or a drawn or otherwise created image. For example, a 2D image of a playing card could be applied as a texture to a rectangular planar surface to create a virtual 3D object representing and resembling a playing card that can be manipulated in the 3D space of the virtual 3D model.

In some embodiments, as described further below, the 3D scene displayed to the player may be computed as a particular view of the virtual 3D model from a virtual camera location within the 3D space; i.e., the view as if the player were looking at the objects in the virtual 3D model from the location of the virtual camera pointing in the direction specified for the virtual camera. For a true 3D display, the view of the virtual 3D model from the virtual camera location may be computed based on the data of the virtual objects' shapes (e.g., surfaces, point meshes, etc.), textures, locations and/or other suitable specifications, and the generated 3D scene may be displayed to the player. For a stereoscopic display, views of the virtual 3D model may be generated from two slightly different virtual camera viewpoints around the virtual camera location, one each for the left and right eyes of the player.

The inventors have recognized that in some cases, as described further below, the generation of a 3D view of a gaming environment may create distortions of the appearance of some game components relative to how they would appear in a corresponding 2D version of the gameplay. For example, a virtual 3D object whose front surface corresponds to the surface that would normally be seen in a corresponding 2D game might be viewed from a virtual camera location that is at an angle to the virtual 3D object in the virtual 3D model, such that a side surface of the virtual 3D object becomes visible in the 3D scene. In another example, as described further below, a 2D image applied as a texture to a surface of a virtual 3D object may appear distorted when the surface is viewed from an angle in the 3D scene instead of from the front. The inventors have recognized that such distortions sometimes may not be desirable in the 3D display of wagering games, and it may be desirable to introduce compensation to allow a head-on front view of a virtual game component from any virtual camera location. For example, in some cases, a 2D image applied as a texture to a surface of a virtual 3D object may only be licensed for use without alterations, and angular viewing distortions may be considered alteration that would violate license agreements. Other examples of cases in which distortion compensation may be desirable in generating a scene for 3D display are described further below.

Accordingly, described herein are techniques for compensating for angular viewing distortions in a scene for 3D display. While a number of inventive techniques are described herein, it should be appreciated that embodiments of the present disclosure may include any one of these techniques, any combination of two or more techniques, or all of the techniques, as aspects of the present disclosure are not limited to any particular number or combination of the techniques described herein. The aspects of the present disclosure described herein can be implemented in any of numerous ways, and are not limited to any particular details of implementation. Described below are examples of specific implementations; however, it should be appreciated that these examples are provided merely for purposes of illustration, and that other implementations are possible.

In some embodiments, one or more techniques described herein may be used in a system for controlling an electronic gaming machine (EGM) in a casino (e.g., a slot machine). The techniques described herein may also be used with other types of devices, including but not limited to PCs, laptops, tablets, smartphones, etc. Although not required, some of these devices may have one or more communication capabilities (e.g., Ethernet, wireless, mobile broadband, etc.), which may allow the devices to access a gaming site or a portal (which may provide access to a plurality of gaming sites) via the Internet.

FIG. 1 is a perspective view of an illustrative EGM 10 where a gesture input interface may be provided, in accordance with some embodiments. In the example of FIG. 1, the EGM 10 includes a display 12 that may be a thin film transistor (TFT) display, a liquid crystal display (LCD), a cathode ray tube (CRT) display, a light emitting diode (LED) display, an organic LED (OLED) display, or a display of any other suitable type. Display 12 may include at least one three-dimensional (3D) display for displaying 3D images of one or more 3D environments (e.g., virtual or real-world 3D environments). In some embodiments, the 3D display device may be a stereoscopic display, an autostereoscopic display, a holographic display, a volumetric display, a compressive light field display, a side-by-side viewing display, a display with filter arrays, and/or any other suitable 3D display. In embodiments where the 3D display device includes an autostereoscopic display, the autostereoscopic display may include any suitable component(s) for directing images to specified viewers or viewing regions, including, without limitation, a parallax barrier, a lenticular lens, and/or an integral imaging array. In embodiments where the 3D display device includes a stereoscopic display, the stereoscopic display may include any suitable viewing device, including, without limitation, any suitable active 3D viewer or passive 3D viewer.

In some embodiments, the 3D display device may display any suitable type of 3D image using any suitable technique, including, without limitation, anaglyph images, polarized projections, autostereoscopic images, computer-generated holograms, volumetric images, infra-red laser projections, auto stereograms, pulfrich effects, prismatic and self-masking crossview glasses, lenticular prints, wiggle stereoscopy, active 3D viewers (e.g., liquid crystal shutter glasses, red eye shutter glasses, virtual reality headsets, personal media viewers, etc.), and/or passive 3D viewers (e.g., linearly polarized glasses, circularly polarized glasses, interference filter technology glasses, complementary color anaglyphs, compensating diopter glasses for red-cyan method, Color-Code 3D, ChromaDepth method and glasses, Anachrome compatible color anaglyph method, etc.). In some embodiments, the 3D display device may comprise a display manufactured by SeeFront GmbH.

The EGM 10 may further include a second display 14, which may be used in addition to the display 12 to show game data and/or other information. In some embodiments, the display 14 may be used to display an advertisement for a game, one or more rules of the game, pay tables, pay lines, and/or any other suitable information, which may be static or dynamically updated. In some embodiments, the display 14 may be used together with the display 12 to display all or part of a main game or a bonus game.

In some embodiments, one or both of the displays 12 and 14 may have a touch screen lamination that includes a transparent grid of conductors. A human fingertip touching the screen may change the capacitance between the conductors at the location of the touch, so that the coordinates of that location may be determined. The coordinates may then be processed to determine a corresponding function to be performed. Such touch screens are known in the art as capacitive touch screens. Other types of touch screens, such as resistive touch screens, may also be used.

In the example of FIG. 1, the EGM 10 has a coin slot 22 for accepting coins or tokens in one or more denominations to generate credits for playing games. The EGM may also include a slot 24 for receiving a ticket for cashless gaming. The received ticket may be read using any suitable technology, such as optical, magnetic, and/or capacitive reading technologies. In some embodiments, the slot 24 may also be used to output a ticket, which may carry preprinted information and/or information printed on-the-fly by a printer within the EGM 10. The printed information may be of any suitable form, such as text, graphics, barcodes, QR codes, etc.

In the example of FIG. 1, the EGM 10 has a coin tray 32 for receiving coins or tokens from a hopper upon a win or upon the player cashing out. However, in some embodiments, the EGM 10 may be a gaming terminal that does not pay in cash but only issues a printed ticket for cashing in elsewhere. In some embodiments, a stored value card may be loaded with credits based on a win, or may enable the assignment of credits to an account (e.g., via a communication network).

In the example of FIG. 1, the EGM 10 has a card reader slot 34 for receiving a card that carries machine-readable information, such as a smart card, magnetic strip card, or a card of any other suitable type. In some embodiments, a card reader may read the received card for player and credit information for cashless gaming. For example, the card reader may read a magnetic code from a player tracking card, where the code uniquely identifies a player to the EGM 10 and/or a host system to which the EGM 10 is connected. In some embodiments, the code may be used by the EGM 10 and/or the host system to retrieve data related to the identified player. Such data may affect the games offered to the player by the EGM 10. In some embodiments, a received card may carry credentials that may enable the EGM 10 and/or the host system to access one or more accounts associated with a player. The account may be debited based on wagers made by the player and credited based on a win. In some embodiments, a received card may be a stored value card, which may be debited based on wagers made by the player and credited based on a win. The stored value card may not be linked to any player account, but a player may be able to assign credits on the stored value card to an account (e.g., via a communication network).

In the example of FIG. 1, the EGM 10 has a keypad 36 for receiving player input, such as a user name, credit card number, personal identification number (PIN), and/or any other player information. In some embodiments, a display 38 may be provided above the keypad 36 and may display a menu of available options, instructions, and/or any other suitable information to a player. Alternatively, or additionally, the display 38 may provide visual feedback of which keys on the keypad 36 are pressed.

In the example of FIG. 1, the EGM 10 has a plurality of player control buttons 39, which may include any suitable buttons or other controllers for playing any one or more games offered by EGM 10. Examples of such buttons include, but are not limited to, a bet button, a repeat bet button, a spin reels (or play) button, a maximum bet button, a cash-out button, a display pay lines button, a display payout tables button, select icon buttons, and/or any other suitable buttons. In some embodiments, any one or more of the buttons 39 may be replaced by virtual buttons that are displayed and can be activated via a touch screen.

Figure 2:
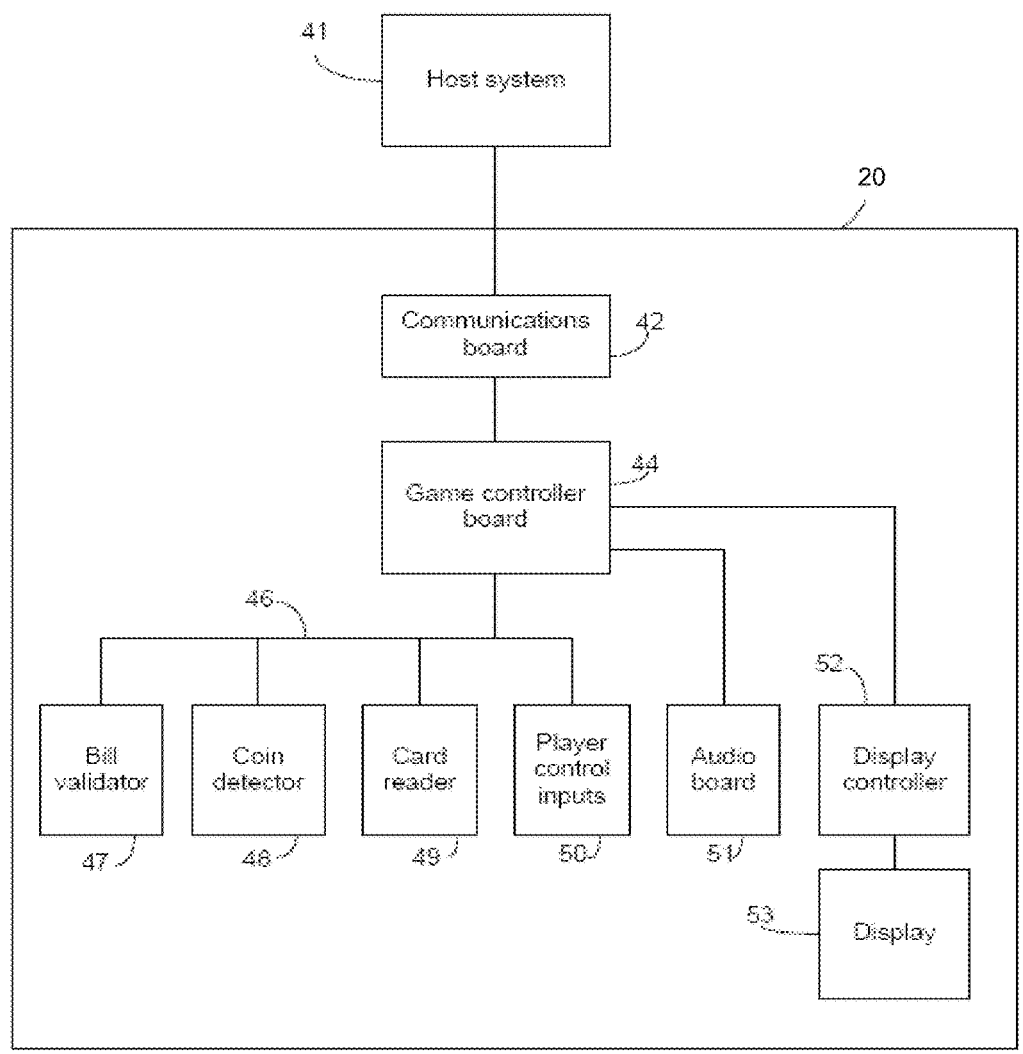
FIG. 2 is a block diagram of an illustrative EGM linked to a host system, in accordance with some embodiments.

FIG. 2 is a block diagram of an illustrative EGM 20 linked to a host system 41, in accordance with some embodiments. In this example, the EGM 20 includes a communications board 42, which may contain circuitry for coupling the EGM 20 to a local area network (LAN) and/or other types of networks using any suitable protocol, such as a G2S (Game to System) protocol. The G2S protocols, developed by the Gaming Standards Association, are based on standard technologies such as Ethernet, TCP/IP and XML and are incorporated herein by reference.

In some embodiments, the communications board 42 may communicate with the host system 41 via a wireless connection. Alternatively, or additionally, the communications board 42 may have a wired connection to the host system 41 (e.g., via a wired network running throughout a casino floor).

In some embodiments, the communications board 42 may set up a communication link with a master controller and may buffer data between the master controller and a game controller board 44 of the EGM 20. The communications board 42 may also communicate with a server (e.g., in accordance with a G2S standard), for example, to exchange information in carrying out embodiments described herein.

In some embodiments, the game controller board 44 may contain one or more non-transitory processor-readable media (e.g., memory) and one or more processors for carrying out programs stored in the non-transitory processor-readable media. For example, the processor(s) may be programmed to transmit information in response to a request received from a remote system (e.g., the host system 41). In some embodiments, the game controller board 44 may execute not only programs stored locally, but also instructions received from a remote system (e.g., the host system 41) to carry out one or more game routines.

In some embodiments, the EGM 20 may include one or more peripheral devices and/or boards, which may communicate with the game controller board 44 via a bus 46 using, for example, an RS-232 interface. Examples of such peripherals include, but are not limited to, a bill validator 47, a coin detector 48, a card reader 49, and/or player control inputs 50 (e.g., the illustrative buttons 39 shown in FIG. 1 and/or a touch screen). However, it should be appreciated that aspects of the present disclosure are not limited to the use of any particular one or combination of these peripherals, as other peripherals, or no peripheral at all, may be used.

In some embodiments, the game controller board 44 may control one or more devices for producing game output (e.g., sound, lighting, video, haptics, etc.). For example, the game controller board 44 may control an audio board 51 for converting coded signals into analog signals for driving one or more speakers (not shown). The speakers may be arranged in any suitable fashion, for example, to create a surround sound effect for a player seated at the EGM 20. As another example, the game controller board 44 may control a display controller 52 for converting coded signals into pixel signals for one or more displays 53 (e.g., the illustrative display 12 and/or the illustrative display 14 shown in FIG. 1).

In some embodiments, the display controller 52 and the audio board 51 may be connected to parallel ports on the game controller board 44. However, that is not required, as the electronic components in the EGM 20 may be arranged in any suitable way, such as onto a single board.

Although some illustrative EGM components and arrangements thereof are described above in connection with FIGS. 1 and 2, it should be appreciated that such details of implementation are provided solely for purposes of illustration. Other ways of implementing an EGM are also possible, using any suitable combinations of input, output, processing, and/or communication techniques.

In some embodiments, an EGM may be configured to provide 3D enhancements, for example, using a 3D display. For example, the EGM may be equipped with an autostereoscopic display, which may allow a player to view images in 3D without wearing special glasses. Other types of 3D displays, such as stereoscopic displays and/or true 3D displays such as holographic displays, may be used in addition to, or instead of autostereoscopic displays, as aspects of the present disclosure are not limited to the use of autostereoscopic displays. In some embodiments, an eye-tracking technology and/or head-tracking technology may be used to detect the player's position in front of the display, for example, by analyzing in real time one or more images of the player captured using a camera in the EGM. Using the position information detected in real time by an eye tracker, two images, one for the left eye and one for the right eye, may be merged into a single image for display. A suitable optical overlay (e.g., with one or more lenticular lenses) may be used to extract from the single displayed image one image for the left eye and a different image for the right eye, thereby delivering a 3D visual experience.

Although embodiments have been described in which a 3D display device is included in an EGM cabinet 10 housing a casino game machine, some embodiments are not limited in this manner. Some embodiments may be implemented using any suitable 3D display device, whether standing alone or included in another device (e.g., a 3D television, a mobile computing device, a head-mounted display, a cabinet 10 housing a casino game machine, or any other suitable device).

Figure 3:
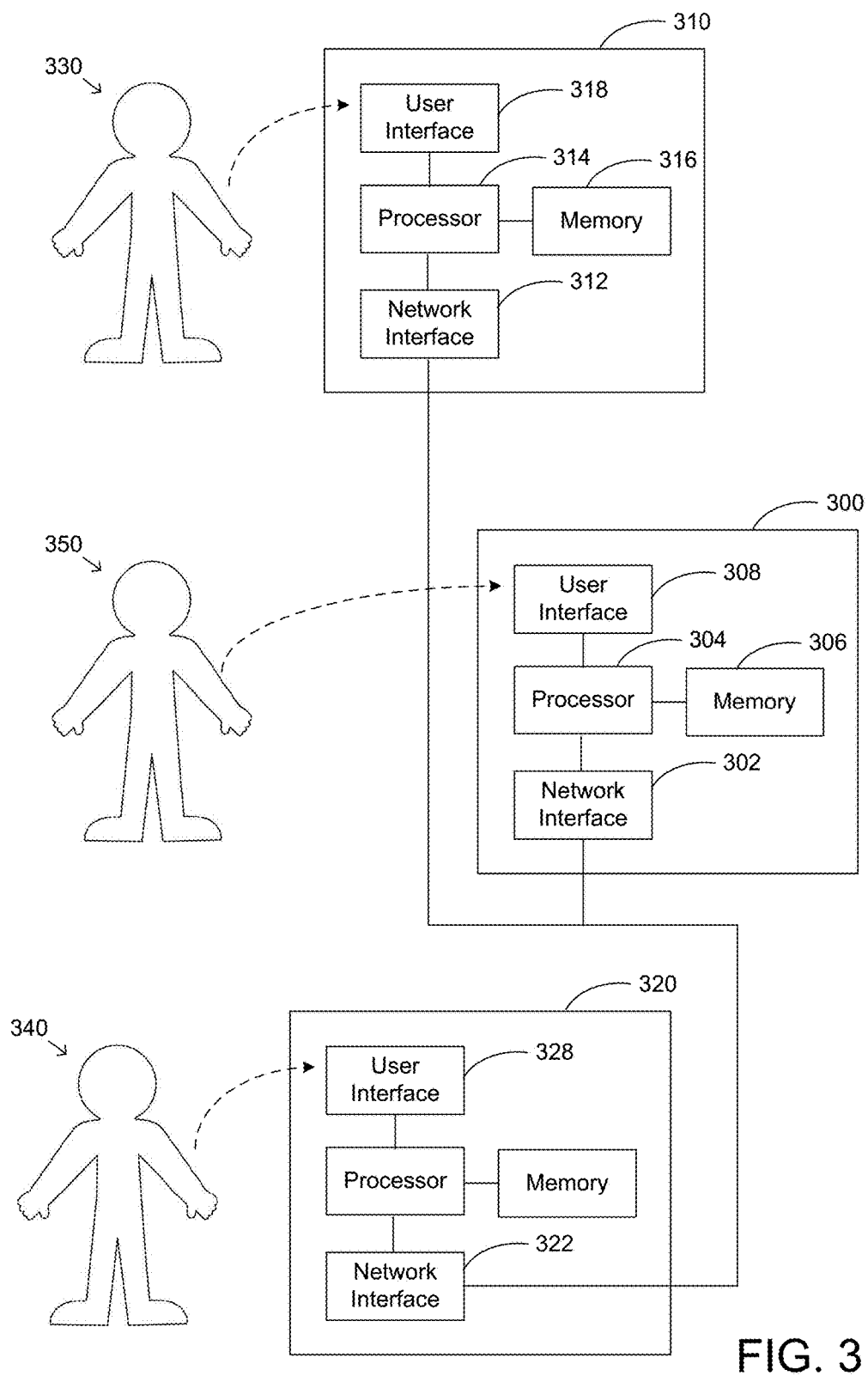
FIG. 3 is a block diagram illustrating an exemplary operating environment for a casino game machine in accordance with some embodiments.

FIG. 3 illustrates an operating environment including an exemplary control system 310 that may be used in some embodiments to control a wagering gaming machine, such as exemplary EGM 10 and/or EGM 20, in accordance with one or more embodiments. Control system 310 may be implemented in any suitable form, as embodiments are not limited in this respect. For example, control system 310 may be implemented as a single stand-alone machine, or may be implemented by multiple distributed machines that share processing tasks in any suitable manner. Control system 310 may be implemented as one or more computers; an example of a suitable computer is described below.

In some embodiments, control system 310 may include one or more tangible, non-transitory processor-readable storage devices storing processor-executable instructions, and one or more processors that execute the processor-executable instructions to perform one or more tasks and/or processes described herein, including, but not limited to, image-generation tasks and/or processes, display-control tasks and/or processes, etc. The storage devices may be implemented as processor-readable storage media (i.e., tangible, non-transitory processor-readable media) encoded with the processor-executable instructions; examples of suitable processor-readable storage media are discussed below. An example of a suitable storage medium is memory 316 depicted in FIG. 3, which is operatively connected to processor 314 for executing instructions stored in memory 316. In one example, processor 314 and memory 316 may be a processor and memory contained in game controller board 44, which may provide functionality for operating one or more games on the EGM, in addition to providing control functionality described herein. In another example, processor 314 and/or memory 316 may be separate from game controller board 44 and may assert control signals upon game controller board 44 for affecting the operation of game controller board 44 in operating one or more games on the EGM. When components of control system 310 are separate from components of the EGM described above, the components of control system 310 may be housed in any suitable location in any suitable configuration, within and/or attached to cabinet 10 and/or separated therefrom.

Exemplary control system 310 also includes a user interface component 318 configured to allow a user (player) 330 to interact with the wagering gaming machine. User interface component 318 may be implemented in any suitable form, as embodiments are not limited in this respect. In some embodiments, user interface component 318 may be configured to receive input from player 330 in any suitable form, such as by button, touchscreen, touchless control gesture, speech commands, etc., and may be configured to provide output to player 330 in any suitable form, such as audio output and/or visual output on a 2D or 3D display. In one exemplary embodiment, user interface component 318 may include one or more components of the casino game machine housed in cabinet 10, such as player control inputs 50, audio board 51, display controller 52, and/or displays 53.

FIG. 3 further illustrates an example of a casino environment including a central control system 300 having an interface 302 for wired and/or wireless communication with local control systems for casino game machines 310 and 320 (and possibly other casino game machines) via their respective network interfaces 312 and 322. Exemplary central control system 300 includes one or more processors 304 and memory 306 (e.g., one or more processor-readable storage media) storing processor-executable instructions for causing processor 304 to perform functions such as transmitting control commands to casino game machines 310 and 320. For example, central control system 300 may, through execution by processor 304 of stored program instructions, stream game content to casino game machines 310 and 320 and/or instruct casino game machines 310 and 320 to implement game adjustments selected by central control system 300 at times determined by central control system 300. In various embodiments, gaming functionality may be distributed between central control system 300 and game machine terminals such as 310 and 320 in any suitable way, making use of any suitable division of functionality. For instance, in some exemplary embodiments, central control system 300 may download games to game machine terminals 310 and/or 320, which may execute the game programs including performing random number generation for determining probabilistic symbol outcomes. In other exemplary embodiments, central control system 300 may perform random number generation and execute game programs for game machine terminals 310 and/or 320, which may merely display output (e.g., 3D images) received from central control system 300 and collect user input from users 330 and 340 via user interfaces 318 and 328 for transmission to central control system 300 via the network interfaces. In some embodiments, central control system 300 may have its own user interface 308 for interaction with a user 350. In some embodiments, central control system 300 may also be configured to function as a casino game machine with player interaction capabilities. However, in other embodiments, central control system 300 may simply function as a server providing functions to other casino game machines such as 310 and 320.

Figure 4:
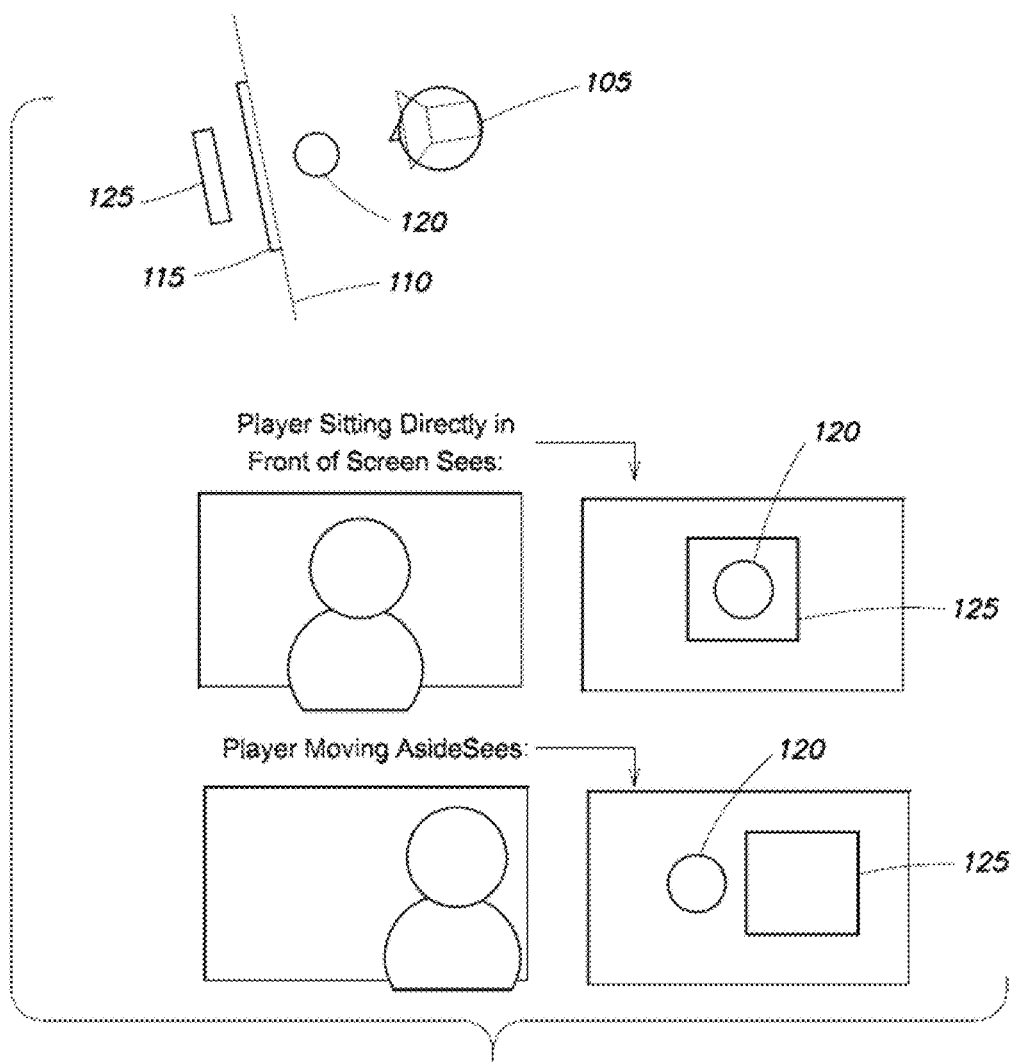
FIG. 4 illustrates some examples of visual illusions created using an autostereoscopic display, in accordance with some embodiments.

FIG. 4 illustrates some examples of visual illusions created using a 3D display such as an autostereoscopic display, in accordance with some embodiments. In this example, a player 105 may be seated in front of an autostereoscopic display 110. Using autostereoscopic techniques such as those discussed above, one image may be shown to the player's left eye and a different image may be shown to the player's right eye. These different images may be processed by the player's brain to give the perception of 3D depth. For example, the player may perceive a spherical object 120 in front of the display 110 and a square object 125 behind the display 110. Furthermore, although not shown, a perception that the spherical object 120 is moving towards the player and/or a perception that the square object is moving away from the player may be created by dynamically updating the combined image shown on the display 110.

In some embodiments, if the player moves to one side of the screen (e.g., to the right), this movement may be detected (e.g., using an eye tracker) and the display may be dynamically updated so that the player will see the spherical object 120 offset from the square object 125 (e.g., to the left of the square object 125), as if the objects were truly at some distance from each other along a z-axis (i.e., an axis orthogonal to the plane in which the display 110 lies).

Any suitable autostereoscopic display technique may be used. Some autostereoscopic display techniques are described below with reference to FIGS. 5-6. In some embodiments, a stereoscopic image comprising a left-eye view and a right-eye view of the virtual 3D environment may be displayed. (A left-eye view and a right-eye view of a 3D environment may depict the 3D environment from the viewpoints of a left eye and a right eye, respectively.) In some embodiments, the left-eye view may be displayed in a first single, fixed viewing zone and the right-eye view displayed in a second single, fixed viewing zone. In some embodiments, the left-eye view and the right-eye view may each be displayed in multiple fixed viewing zones.

In some embodiments, the position of the viewer's head and/or eyes may be tracked, and the left-eye and right-eye views may be displayed in dynamic viewing zones. In some embodiments, the dynamic viewing zones may be adjusted as the viewer's head and/or eyes move, such that the viewer's left eye remains in the left-eye zone and the reviewer's right eye remains in the right-eye zone, even as the viewer's position changes. In some embodiments, the position of the viewer's head and/or eyes may be tracked using any suitable technique, including head-tracking techniques and/or eye-tracking techniques. In some embodiments, the positions of multiple viewers' heads and/or eyes may be tracked, and the left-eye and right-eye views may be displayed in dynamic viewing zones such that each viewer's left eye remains in a left-eye zone and each viewer's right eye remains in a right-eye zone, even as the viewers' positions change.

Figure 5:
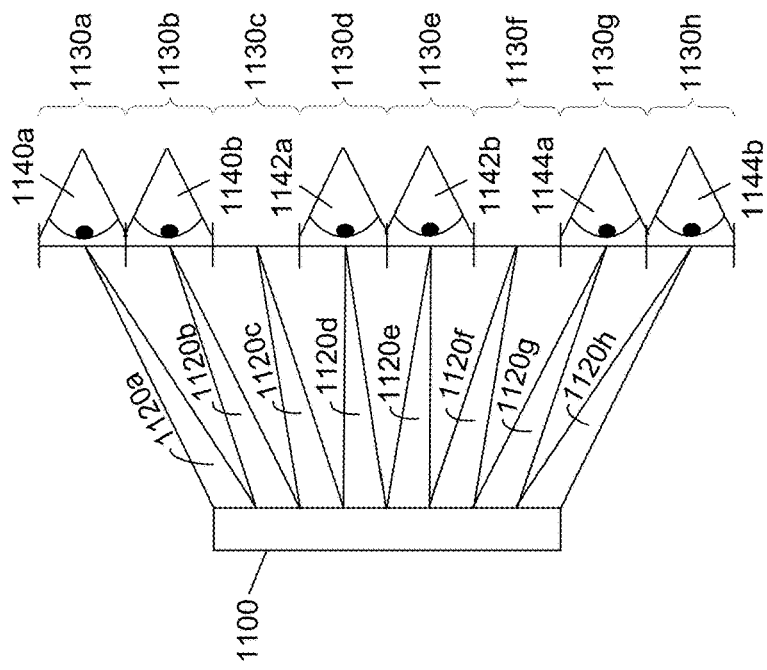
FIG. 5 is a functional sketch illustrating an autostereoscopic display with static viewing zones in accordance with some embodiments.

FIG. 5 shows an autostereoscopic display 1100 with static viewing zones 1130 in accordance with some embodiments. An autostereoscopic display may exhibit static viewing zones when the display configures fixed sets of pixels 1120 to be viewable, respectively, from fixed spatial regions (fixed "viewing zones") 1130.

In the example of FIG. 5, the pixels of display 1100 are divided into eight fixed sets 1120*a*-1120*h*, which are displayed in eight corresponding static viewing zones 1130*a*-1130*h*. In the example of FIG. 5, the pixel resolution in each viewing zone 1130 may be one-eighth of the total pixel resolution of display 1100. In the example of FIG. 5, three viewers 1140-1144 are shown viewing six fixed sets of pixels in six static viewing zones. Specifically, the right eye 1140*a* of viewer 1140 is shown viewing fixed pixel set 1120*a* in static viewing zone 1130*a*, the left eye 1140*b* of viewer 1140 is shown viewing fixed pixel set 1120*b* in static viewing zone 1130*b*, the right eye 1142*a* of viewer 1142 is shown viewing fixed pixel set 1120*d* in static viewing zone 1130*d*, the left eye 1142*b* of viewer 1142 is shown viewing fixed pixel set 1120*e* in static viewing zone 1130*e*, the right eye 1144*a* of viewer 1144 is shown viewing fixed pixel set 1120*g* in static viewing zone 1130*g*, and the left eye 1144*b* of viewer 1144 is shown viewing fixed pixel set 1120*h* in static viewing zone 1130*h*. In the example of FIG. 5, no viewers are shown viewing fixed pixel sets 1120*c* and 1120*f* in static viewing zones 1130*c* and 1130*f*.

Figure 6:
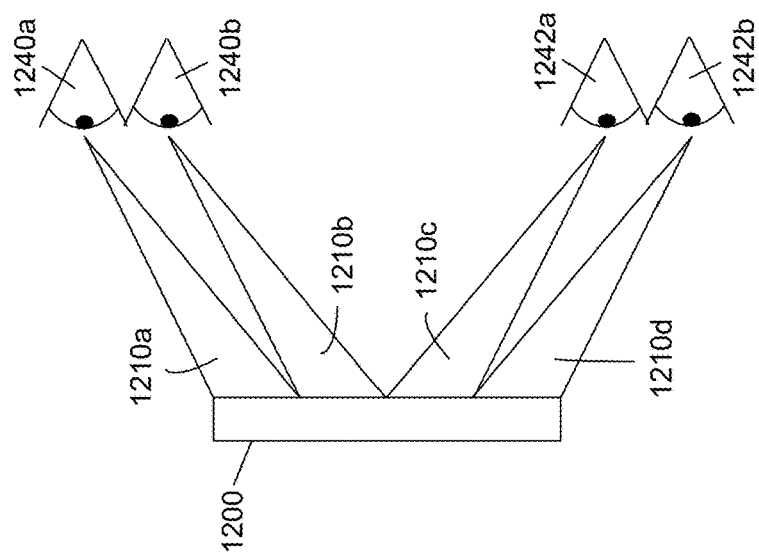
FIG. 6 is a functional sketch illustrating an autostereoscopic display with dynamic viewing zones in accordance with some embodiments.

The pixels of auto stereoscopic display 1100 may be apportioned among the fixed pixel sets using any suitable technique. In some embodiments, the display's pixels may be apportioned equally among the fixed pixel sets, such that the pixel resolutions of the static viewing zones are substantially equal. In some embodiments, the display's pixels may be apportioned unequally among the fixed pixel sets, such that the pixel resolutions of at least some viewing zones may differ. In some embodiments, a parallax barrier, lenticular lens, and/or integral imaging array may be used to apportion the display's pixels among the fixed pixel sets. In some embodiments, different pixel columns or pixel rows may be apportioned to different fixed pixel sets. It should be appreciated that a division of a display's pixels into equal or unequal sets may be accomplished in any suitable way and/or pattern. For example, while FIGS. 5 and 6 illustrate different pixel sets as if they may be non-overlapping on the display, this is merely for ease of illustration in the drawings. While some exemplary embodiments may implement non-overlapping pixel sets, other exemplary embodiments may have different pixel sets that overlap, such as, for example, a left-eye set of pixels that includes every other (e.g., odd numbered) column of pixels, and a right-eye set of pixels that includes the remaining (e.g., even numbered) columns of pixels. In another example, four pixel sets may be created by allocating every fourth column (or row, or square, or any other suitable pattern) of pixels to a particular pixel set, etc.

In some embodiments, autostereoscopic display 1100 may divide its pixels into any suitable number of fixed pixel sets 1120 and may display the pixel sets using any suitable number of static viewing zones 1130. In some embodiments, the number of fixed sets of pixels and the corresponding number of static viewing zones may be between 2 and 128, between 2 and 64, between 2 and 32, between 2 and 24, between 2 and 16, between 2 and 8, between 2 and 4, or 2.

In some embodiments, autostereoscopic display 1100 may display a 3D image of a 3D environment (e.g., a virtual 3D environment or a real-world 3D environment). In some embodiments, each of the fixed pixel sets 1120 may display a view of the 3D environment.

In some embodiments, autostereoscopic display 1100 may display a 3D image of a 3D environment by displaying two fixed pixel sets 1120 in two corresponding static viewing zones 1130. The fixed pixel sets may depict left-eye and right-eye views of the 3D environment, respectively. In some embodiments, a viewer may view the 3D image, with stereo parallax, by positioning the viewer's left and right eyes, respectively, in the viewing zones where the left-eye and right-eye views of the 3D environment are displayed. In other words, the autostereoscopic display may use two static viewing zones to display a single 3D image with stereo parallax.

In some embodiments, autostereoscopic display 1100 may display a 3D image of a 3D environment by displaying multiple fixed pixel sets 1120 in multiple corresponding static viewing zones 1130. In some embodiments, each of the fixed pixel sets may depict the same left-eye view or right-eye view of the 3D environment, such that a viewer may view the 3D image, with stereo parallax, by positioning the viewer's left and right eyes, respectively, in any two viewing zones where the left-eye and right-eye views of the 3D environment are displayed. In other words, the autostereoscopic display may use multiple static viewing zones to display multiple copies of the same 3D image with stereo parallax.

In some embodiments, the autostereoscopic display 1100 with multiple fixed pixel sets 1120 and multiple corresponding static viewing zones 1130 may display a 3D image with stereo parallax and coarse-grained movement parallax. In some embodiments, each of the fixed pixel sets may depict a different view of the 3D environment, such that a viewer observing the 3D image from different viewing zones may see different views depicting the 3D environment from different viewpoints. In some embodiments, the number of different views displayed by display 1100 may be limited by the number of static viewing zones. Thus, the coarseness of the 3D image's movement parallax may be determined by the number of static viewing zones, and may improve as the number of static viewing zones increases.

In some embodiments, the autostereoscopic display 1100 with multiple fixed pixel sets 1120 and multiple corresponding static viewing zones 1130 may display a 3D image with stereo parallax and fine-grained movement parallax. The fine-grained movement parallax may be achieved by adjusting the view displayed in a static viewing zone based on the position of the viewer's eye within the static viewing zone. In some embodiments, eye-tracking techniques may be used to determine the position of the viewer's eye within the static viewing zone (e.g., the location of the viewer's pupil relative to the left-side and right-side boundaries of the static viewing zone in which the viewer's eye is located). For example, eye-tracking techniques may be used to determine the position of the viewer's right eye 1140*a* within static viewing zone 1130*a*. In some embodiments, in response to a change in the position of the viewer's eye within a static viewing zone, the autostereoscopic display may make a corresponding adjustment to the viewpoint of the view displayed in that static viewing zone. For example, as the position of eye 1140*a* changes within static viewing zone 1130*a*, display 1100 may adjust the viewpoint of the view displayed by fixed pixel set 1120*a*. Thus, rather than observing movement parallax only when moving between viewing zones, the viewer may experience movement parallax even when moving within a viewing zone. In some embodiments, this technique may yield fine-grained movement parallax.

FIG. 6 shows an autostereoscopic display 1200 with dynamic viewing zones in accordance with some embodiments. An autostereoscopic display may exhibit dynamic viewing zones when the display dynamically configures different sets of pixels 1210 to be viewable, respectively, from different spatial regions (different "viewing zones"). In contrast to an autostereoscopic display 1100 with static viewing zones, which may 'waste' some pixels by allocating those pixels to static viewing zones in which no viewers are present (see, e.g., pixel sets 1120*c* and 1120*f* and static viewing zones 1130*c* and 1130*f* in FIG. 5), autostereoscopic display 1200 may dynamically allocate pixels to viewing zones in which viewers are present. In some embodiments, the use of dynamic viewing zones may tend to improve the pixel resolution in each viewing zone by reducing or eliminating the number of 'wasted' pixels.

In the example of FIG. 6, two viewers 1240 and 1242 are shown viewing an autostereoscopic display 1200, which is configured to use dynamic viewing zones. In the example of FIG. 6, the pixels of display 1200 are divided into four sets 1210*a*-1210*d*, which are displayed in four dynamic viewing zones determined by the locations of the viewers' eyes. Specifically, the right eye 1240*a* of viewer 1240 is shown viewing pixel set 1210*a* in a dynamic viewing zone, the left eye 1240*b* of viewer 1240 is shown viewing pixel set 1210*b* in a dynamic viewing zone, the right eye 1242*a* of viewer 1242 is shown viewing pixel set 1210*c* in a dynamic viewing zone, and the left eye 1242*b* of viewer 1242 is shown viewing pixel set 1210*d* in a dynamic viewing zone. In some embodiments, in response to detecting a number of viewers N, display 1200 may apportion the pixels among the N viewers by dividing the pixels into 2N viewing zones (two viewing zones per viewer).

In some embodiments, autostereoscopic display 1200 may track the locations of viewers using any suitable tracking technique (e.g., any suitable position-tracking technique, head-tracking technique, eye-tracking technique, and/or tracking of any other suitable anatomical feature of the viewer, as discussed further below). In some embodiments, autostereoscopic display 1200 may use the tracking information to determine the locations of the viewers' heads and/or eyes.

In some embodiments, autostereoscopic display 1200 may track the identities of viewers using any suitable identity-tracking technique. In some embodiments, tracking a viewer's identity may comprise assigning the viewer an identification device and tracking the location of the identification device. In some embodiments, the identification device may include an identification code. Any suitable identification device may be used, including, without limitation, an RFID tag or a smart card. In some embodiments, the location of an identification device may be correlated with the location of a viewer to determine the viewer's identity. In some embodiments, tracking a viewer's identity may comprise using facial recognition techniques to identify the viewer and/or distinguish among the viewers.

The pixels of autostereoscopic display 1200 may be apportioned among the dynamic viewing zones using any suitable technique. In some embodiments, the display's pixels may be apportioned equally among the current viewing zones, such that the pixel resolutions of each dynamic viewing zone at any given time are substantially equal. In some embodiments, the display's pixels may be apportioned unequally among the dynamic viewing zones, such that the pixel resolutions of coexisting viewing zones may differ. In some embodiments, a parallax barrier, lenticular lens, and/or integral imaging array may be used to apportion the display's pixels among the viewing zones. In some embodiments, different pixel columns or pixel rows may be apportioned to different viewing zones.

In some embodiments, autostereoscopic display 1200 may display a 3D image of a 3D environment (e.g., a virtual 3D environment or a real-world 3D environment) to a viewer by displaying left-eye and right-eye views of the 3D environment in two viewing zones corresponding to the viewer's two eyes. In some embodiments, in response to a change in the viewer's position, display 1200 may adjust the locations of the viewing zones in accordance the locations of the viewer's eyes, without changing the views presented in the viewing zones. In other words, the autostereoscopic display may use two dynamic viewing zones to display a 3D image to a viewer with stereo parallax.

In some embodiments, autostereoscopic display 1200 may display 3D images of a 3D environment to a viewer by displaying first and second views of the 3D environment in two viewing zones corresponding to the viewer's two eyes. In some embodiments, in response to a change in the viewer's position, display 1200 may adjust the locations of the viewing zones in accordance with the locations of the viewer's eyes, and change the viewpoints of the views presented in the viewing zones. In other words, the autostereoscopic display may use two dynamic viewing zones to display a 3D image to a viewer with stereo parallax and movement parallax.

In some embodiments, autostereoscopic display 1200 may display a 3D image of a 3D environment to multiple viewers by displaying left-eye and right-eye views of the 3D environment in viewing zones corresponding to the viewers' eyes. In some embodiments, in response to a change in a viewer's position, display 1200 may adjust the locations of the corresponding viewing zones in accordance with the locations of the viewer's eyes, without changing the views presented in the viewing zones. In other words, the autostereoscopic display may use multiple dynamic viewing zones to display a 3D image to multiple viewers with stereo parallax.

In some embodiments, autostereoscopic display 1200 may display 3D images of a 3D environment to multiple viewers by displaying multiple views of the 3D environment in multiple viewing zones corresponding to the viewers' eyes. In some embodiments, in response to a change in a viewer's position, display 1200 may adjust the locations of the corresponding viewing zones in accordance with the locations of the viewer's eyes, and change the viewpoints of the views presented in the viewing zones. In other words, the autostereoscopic display may use multiple dynamic viewing zones to display 3D images to multiple viewers with stereo parallax and movement parallax.

Although an autostereoscopic display may facilitate more natural game play, it should be appreciated that aspects of the present disclosure are not limited to the use of an autostereoscopic display. Furthermore, aspects the present disclosure are not limited to the autostereoscopic techniques discussed above, as other autostereoscopic techniques may also be suitable. Also, any suitable type of 3D display technology may be used, including but not limited to true 3D display technologies (e.g., volumetric 3D display technologies such as light field, projected light, integrated imaging, phased array optical, or any other suitable type of volumetric 3D display technology).

Figure 8B:
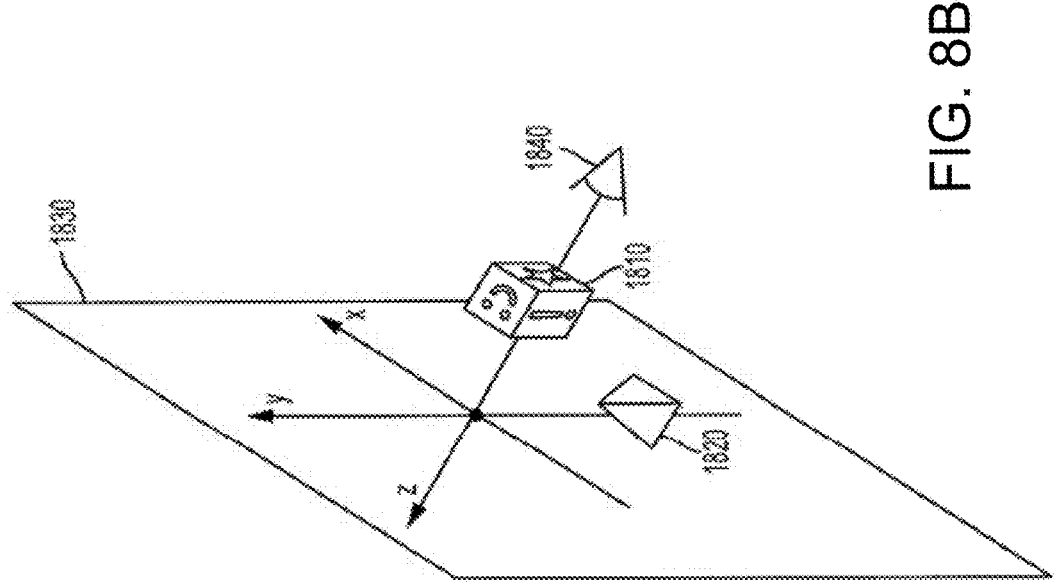
FIG. 8B is a perspective view of an exemplary physical 3D display of a 3D scene that may be created by a gaming system, in accordance with some embodiments.
Figure 8A:
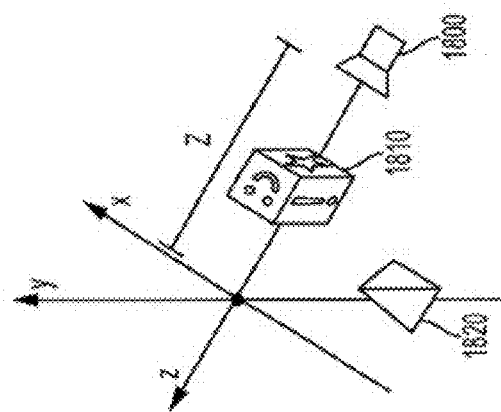
FIG. 8A is a perspective view of an exemplary virtual 3D model that may be created by a gaming system, in accordance with some embodiments.

In some embodiments utilizing an autostereoscopic 3D display, or other type of 3D display, the 3D scene presented to the player via the 3D display device of a wagering gaming apparatus may be generated from a virtual 3D model constructed as data in memory by one or more processors of the wagering gaming apparatus. FIG. 8A graphically illustrates an example of such a virtual 3D model, in which virtual game components such as cube 1810 and pyramid 1820 are located at particular positions within a virtual 3D space. The virtual 3D space is represented using a three-dimensional coordinate system, which in this example includes orthogonal x-, y-, and z-axes that intersect at an origin position in the virtual 3D model. While exemplary x-, y-, and z-axes are utilized herein for purposes of illustration, it should be appreciated that any suitable three-dimensional coordinate system may be used (e.g., Cartesian, spherical, cylindrical, or any other type of three-dimensional coordinate system), as embodiments are not limited in this respect. The virtual game components such as cube 1810 and 1820 may be of any suitable type, form and number, and may be located in any suitable positions in the virtual 3D model as determined by a given game design.

In some embodiments, one or more processors of the wagering gaming apparatus may be programmed to generate a 3D scene as a view from a virtual 3D camera 1800 into the virtual 3D model, creating a visual illusion for the player of viewing the virtual game components in 3D as if the player were standing/sitting at the virtual camera location within the virtual 3D model. This may be done using any suitable 3D graphical data processing technique(s), examples of which are known. FIG. 8B illustrates an exemplary visual illusion of a 3D scene that may be created for a player via a 3D display device, corresponding to the computed view from virtual 3D camera 1800 of the virtual 3D model in FIG. 8A. In the example of FIG. 8B, the visual illusion of the 3D scene is created around a 2D physical screen 1830 whose width dimension corresponds to the x-axis of the virtual 3D model and whose height dimension corresponds to the y-axis of the virtual 3D model. The 3D scene displayed to the player has perceived depth in a direction perpendicular to the screen 1830, corresponding to the z-axis of the virtual 3D model. In the example of FIG. 8B, virtual game components 1810 and 1820 are perceived by the player, via operation of the 3D display device, to be "floating" in front of the screen 1830, at some distance from the screen 1830 in the z-direction.

In some embodiments, it may be desirable to control the positions at which virtual game components appear to the player in the 3D scene in relation to the physical screen 1830. Thus, in some embodiments, the origin position in the virtual 3D model may be mapped to a corresponding origin position on the screen 1830. In some embodiments, the origin position on the screen 1830 may be the center of the screen (e.g., x=y=0); however, this is not required. Any suitable location on the screen 1830 may be designated as the origin position in other embodiments. In some embodiments, the location of virtual 3D camera 1800 within the virtual 3D model may be specified based on the player's positioning in relation to screen 1830, such that the perceived positions of virtual game components 1810 and 1820 to the player with respect to the screen origin will bear a known relation to the positions of the virtual game components 1810 and 1820 in the virtual 3D model with respect to the model origin.

Thus, in some embodiments, a wagering gaming apparatus may utilize one or more sensor devices to sense the physical location of an anatomical feature 1840 of the player, so that the virtual camera location can be specified and/or adjusted accordingly. Any suitable anatomical feature may be selected for detection, although in some embodiments the anatomical feature may be selected to be indicative of the player's viewpoint. In some embodiments, the detected anatomical feature may be the player's head or a more specific feature located on the player's head; in some embodiments, the detected anatomical feature may be either or both of the player's eyes. Hereafter, the detected physical location of this anatomical feature, which may be selected to be any suitable anatomical feature of the player, will be referred to as the player's "viewpoint." Any suitable sensor device(s) may be used to sense the player's viewpoint, examples of which include one or more cameras or eye-tracking devices. These may be the same or different devices as those used to determine the positioning of the player's eyes for projection of autostereoscopic 3D images in some embodiments.

In some embodiments, one or more processors of the wagering gaming apparatus may be programmed to process the detected physical location of the player's viewpoint 1840 to detect a distance D between the player's viewpoint 1840 and the origin position on the screen 1830. In some embodiments, the processor(s) may further be programmed, in generating the 3D scene, to locate virtual 3D camera 1800 at a virtual camera location whose distance Z from the origin position in the virtual 3D model is specified based on the distance D. For example, in some embodiments, the distance Z of the virtual camera location from the model origin may be set equal to the distance D from the player's viewpoint 1840 to the screen origin. In this manner, in some embodiments, the generated 3D scene may cause the player to perceive the virtual game components 1810 and 1820 to be the same physical distance from the screen origin as they are from the origin position in the virtual 3D model.

Figure 9A:
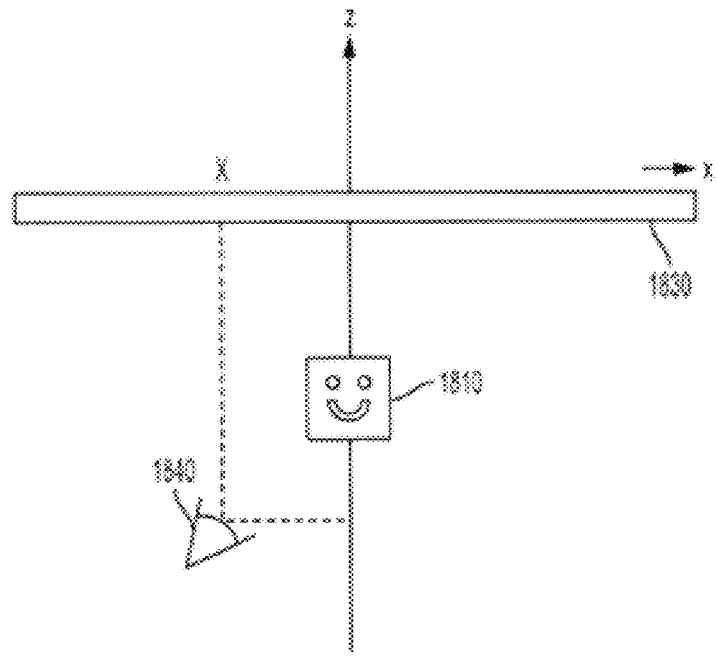
FIG. 9A is a top view of an exemplary physical 3D display of a 3D scene that may be created by a gaming system, in accordance with some embodiments.
Figure 9B:
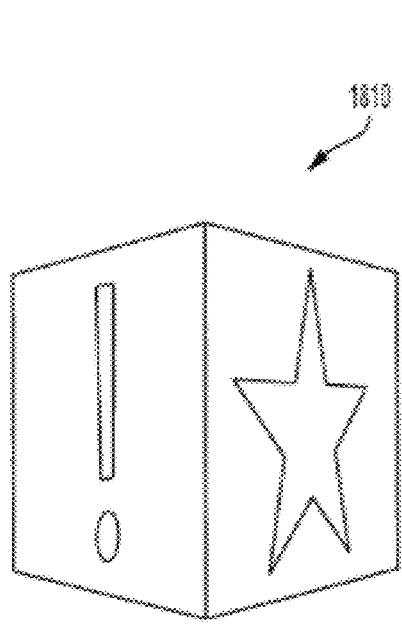
FIGS. 9B and 9C illustrate exemplary 3D views of a virtual game component that may be created by a gaming system, in accordance with some embodiments.
Figure 9C:
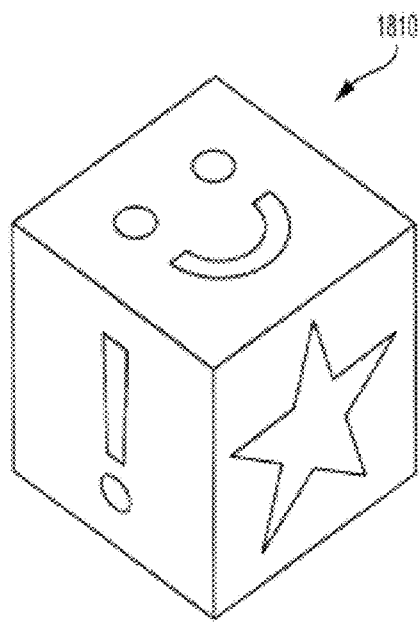

In some embodiments, not only the virtual camera's distance from the model origin may be matched to the player's viewpoint's distance from the screen origin, but also all three-dimensional coordinates of the virtual camera location may be matched to the three-dimensional coordinates of the physical location of the player's viewpoint with respect to the screen origin. For example, in some embodiments, the model origin may be mapped to the physical screen origin, and the x-, y-, and z-coordinates of the virtual camera location may be matched to the x-, y-, and z-coordinates of the physical location of the player's viewpoint. Thus, for example, if the player's viewpoint 1840 were offset horizontally from the screen origin by a distance X, as illustrated in FIG. 9A, in some embodiments the virtual camera location may be correspondingly offset from the model origin, such that the 3D scene generated and displayed to the player represents a view of the virtual game components in the virtual 3D model from the perspective of the player's viewpoint location. FIG. 9B illustrates how cube 1810 may appear to be viewed from an angle by matching the x-coordinate of the virtual camera location to the horizontal offset X of the player's viewpoint 1840 in FIG. 9A. Likewise, if the player's viewpoint 1840 were offset by a vertical distance Y in addition to a horizontal distance X, matching the x- and y-coordinates of the virtual camera location might produce a view of cube 1810 from above and to the left, as illustrated in FIG. 9C.

In some embodiments, however, not all three-dimensional coordinates of the virtual camera location may be matched to the three-dimensional coordinates of the player's viewpoint. For example, FIG. 10A illustrates an embodiment in which the vertical coordinate of virtual 3D camera 1800 is set at y=0, despite the player's viewpoint 1840 being negatively offset in the y-direction (i.e., vertically lower than the screen origin). In this example, maintaining the virtual camera location at y=0 (on the z-axis), as it was in FIG. 8A, causes the player to perceive the cube 1810 as being viewed head-on, as illustrated in FIG. 10B, rather than being viewed from below. Additionally, matching the virtual camera's distance Z from the model origin to the player's viewpoint's distance D from the screen origin causes the player to perceive the cube 1810 as being projected the same distance in front of the screen 1830 as was perceived in FIG. 8B. In this manner, in some embodiments 3D scenes may be generated that allow players of different heights to achieve the same perception of the virtual game components and enjoy the same gaming experience.

Figure 11B:
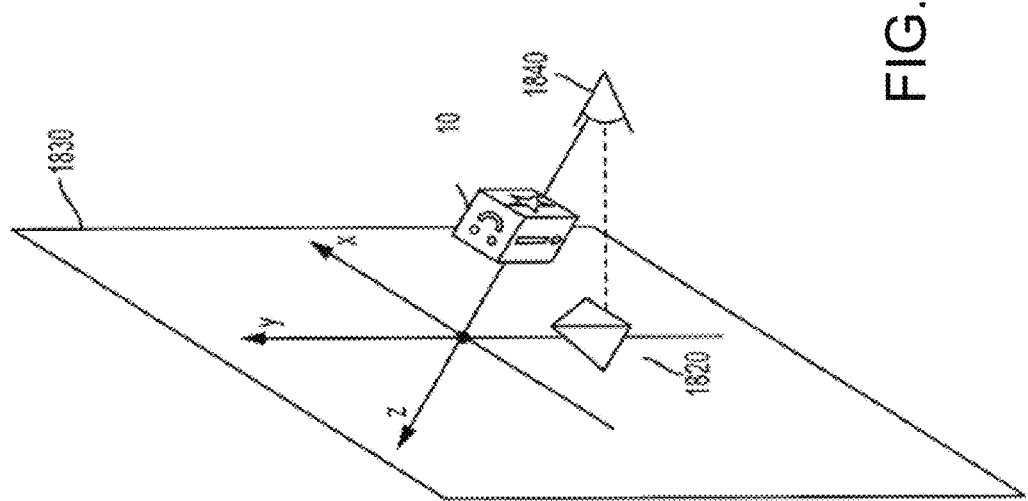
FIG. 11B is a perspective view of an exemplary physical 3D display of a 3D scene that may be created by a gaming system, in accordance with some embodiments.
Figure 11A:
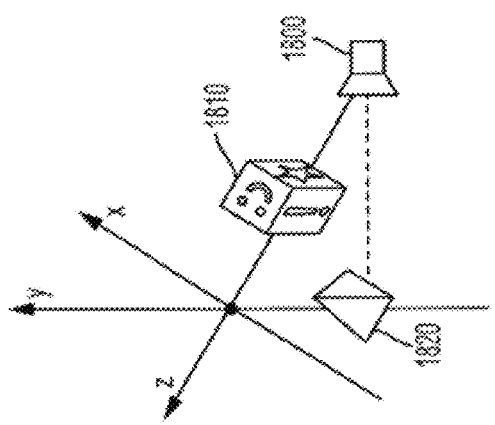
FIG. 11A is a perspective view of an exemplary virtual 3D model that may be created by a gaming system, in accordance with some embodiments.

In some embodiments, one or more sensor devices may alternatively or additionally be configured to sense an orientation of the player's viewpoint (e.g., the direction in which the player is looking), as a viewpoint orientation of the player's detected anatomical feature discussed above. In some embodiments, the viewpoint orientation of the virtual 3D camera 1800 may be set and/or updated based on the orientation of the player's viewpoint. FIGS. 11A and 11B illustrate an example in which the player's viewpoint 1840 in FIG. 11B is oriented toward virtual game component 1820, rather than toward virtual game component 1810 and the screen origin. In this example, the viewpoint orientation of the virtual 3D camera 1800 is likewise directed toward virtual game component 1820 in the virtual 3D model in FIG. 11A, rather than toward the model origin. This setting of the virtual 3D camera's viewpoint orientation may result in the 3D scene being generated as a view centered on virtual game component 1820, creating for the player the illusion of looking straight at that component.

In some embodiments, the 3D scene generated and displayed to the player may be updated in accordance with changes in the player's viewpoint. For example, in some embodiments, the virtual camera's location, viewpoint orientation, and/or field-of-view setting may be changed in accordance with a corresponding change in the player's viewpoint. In some embodiments, the player's viewpoint may be tracked continuously, and the 3D scene may be updated in essentially real time to respond to movement in the player's viewpoint. Generating the 3D scene in some embodiments may involve any one, some, or all of the foregoing considerations (e.g., virtual camera location, viewpoint orientation, and/or field-of-view), in any suitable combination. Likewise, any one, some, or all of these settings and/or computations may be changed in any suitable combination to update a 3D scene in response to a change in the player's viewpoint.

Thus, in some embodiments, when a change is detected in the player's viewpoint orientation, the 3D scene may be updated at least in part by changing the viewpoint orientation of the virtual 3D camera correspondingly. For example, in some embodiments the 3D scene may originally be generated as a view from the virtual 3D camera with its viewpoint orientation toward the model origin, and the 3D scene may be updated at least in part by changing the virtual 3D camera's viewpoint orientation away from the model origin in accordance with a detected change in the player's viewpoint orientation.

Alternatively or additionally, in some embodiments when a change is detected in the player's viewpoint location, the 3D scene may be updated at least in part by changing the virtual camera location in the virtual 3D model. In some embodiments, the virtual 3D camera's distance from the model origin may be updated in accordance with a change in the player's viewpoint's distance from the screen origin. In some embodiments, this may include changing three-dimensional coordinates of the virtual camera location in accordance with respective three-dimensional components of the change in the player's viewpoint location, as illustrated in FIGS. 9A-C. In other embodiments, the detected change in the player's viewpoint location may be separated into various components, and one or more coordinates of the virtual camera location may be changed in accordance with one or more components of the player's viewpoint change, while one or more other coordinates of the virtual camera location may be fixed despite corresponding components of change in the player's viewpoint. For example, in some embodiments, a vertical coordinate (e.g., y-coordinate) of the virtual camera location may be fixed, regardless of any vertical change in the player's viewpoint, while other components of change in the player's viewpoint (e.g., horizontal movement, and/or change in distance from the screen) may trigger corresponding changes in the virtual camera location. In this manner, for example, in some embodiments, a player's experience of the 3D scene may not be changed by the player sitting, standing up, slouching, etc., but the player may be able to look around at the sides of virtual game components (e.g., to discover hidden game content, etc.) and look closer (e.g., "zoom in") on them as desired.

Thus, in some embodiments, physical locations of a player's anatomical features may be detected, e.g., by sensor devices of the wagering gaming apparatus. In some embodiments, these may include one or more anatomical features located on the player's head, which in some embodiments may include one or both of the player's eyes. In some embodiments, the distance between the player's viewpoint (the physical location of the anatomical feature of the player sensed by the sensor device) and the origin position on the screen may be detected, and the virtual 3D camera for generating the 3D scene may be located at a distance Z from the origin position in the virtual 3D model, specified based on the detected distance between the player's viewpoint and the screen origin. The virtual camera location may be mapped to a physical location at coordinates (x, y, z)=(0, 0, Z) from the screen origin. With this mapping, corresponding coordinates for the location of a virtual game component in the 3D scene may be computed, in some embodiments.

As discussed above, the inventors have recognized that it may be beneficial in some cases to compensate for distortions caused when a virtual object (e.g., a virtual game component) having a designated front perspective view is viewed from a different angle instead of directly from the front perspective. This may occur, for example, when a virtual game component has a designated front perspective view specified as the view of the virtual game component from any location on a particular linear viewing ray that extends from a point on the virtual game component out into the virtual 3D space, where the virtual 3D camera must be located on the viewing ray and oriented toward the virtual game component along the viewing ray in order to capture the designated front perspective view of the virtual game component. Alternatively, the designated front perspective view could be defined by a limited range of viewing rays that intersect a limited area of the virtual game component at a limited set of angles. In another example, a virtual game component may have a designated front surface that is substantially planar, and its designated front perspective view may be the view from any viewing ray that intersects the designated front surface substantially orthogonally (e.g., at a substantially right angle). In another example, a virtual game component may have a 2D image assigned (e.g., applied as a texture) to a designated front surface, and the designated front view may be any view of the virtual game component in which the image assigned to the front surface appears undistorted (with the same relative internal shape, dimensions, aspect ratio, etc.) from its normal 2D form.

Figure 12A:
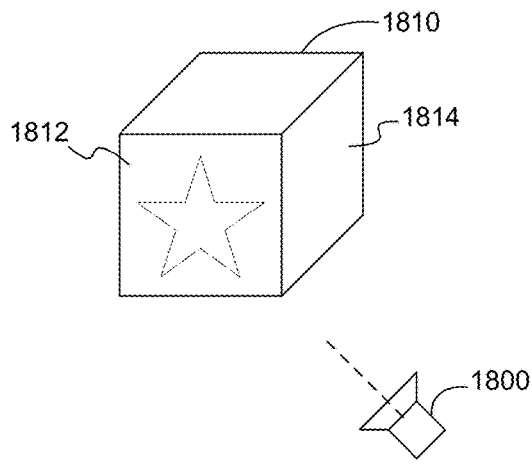
FIGS. 12A-D illustrates an example of warping a virtual 3D object for distortion compensation, in accordance with some embodiments.

In any of these examples (and/or any other suitable example of a virtual game component with a designated front view), the inventors have recognized that distortions may be perceived when the virtual game component is viewed from a perspective other than the designated front perspective. FIG. 12A, for instance, illustrates an example in which cube 1810 is viewed from virtual 3D camera 1800 located at an offset angle rather than directly in front of the designated front surface 1812 with the star image. In this example, the designated front perspective view of cube 1810 is the one depicted in FIG. 10B, where virtual 3D camera 1800 is located on a viewing ray that orthogonally intersects front surface 1812 as in FIG. 8A, and front surface 1812 is viewed directly head-on. However, with virtual 3D camera 1800 located at an offset angle as in FIG. 12A, side surface 1814 of cube 1810 becomes visible, and the front surface 1812 will appear slanted and the star distorted in the resulting 3D scene (similar to FIG. 9B which is from a different angled viewpoint). The inventors have recognized that it may sometimes be beneficial to compensate for such distortion by warping the virtual 3D object within the virtual 3D model to maintain the designated front perspective view of the virtual 3D object in the view from the virtual 3D camera.

Figure 12B:
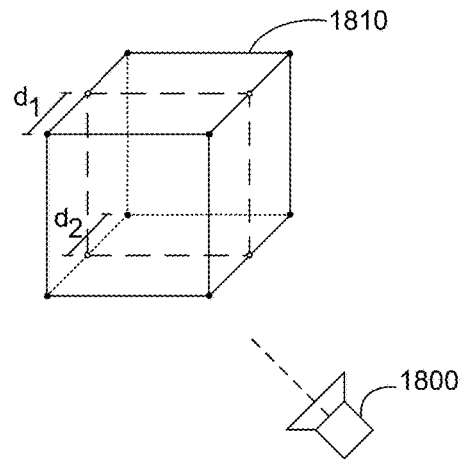
Figure 12C:
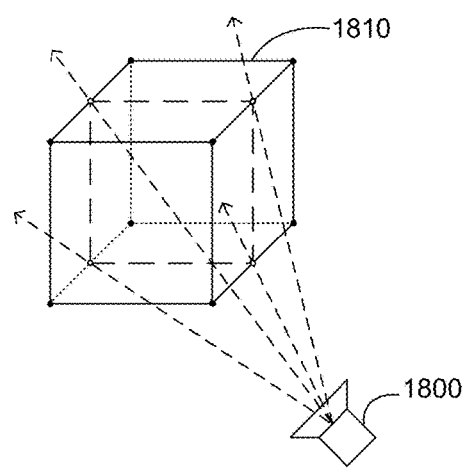
Figure 12D:
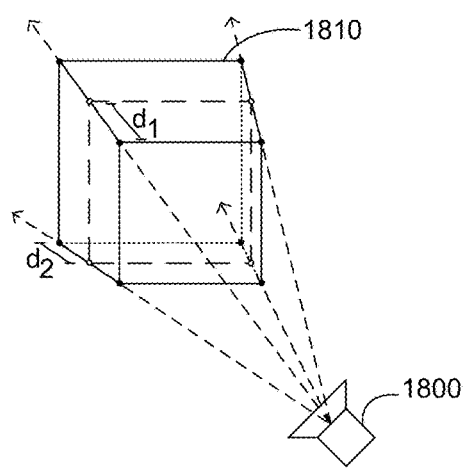
Figure 13:
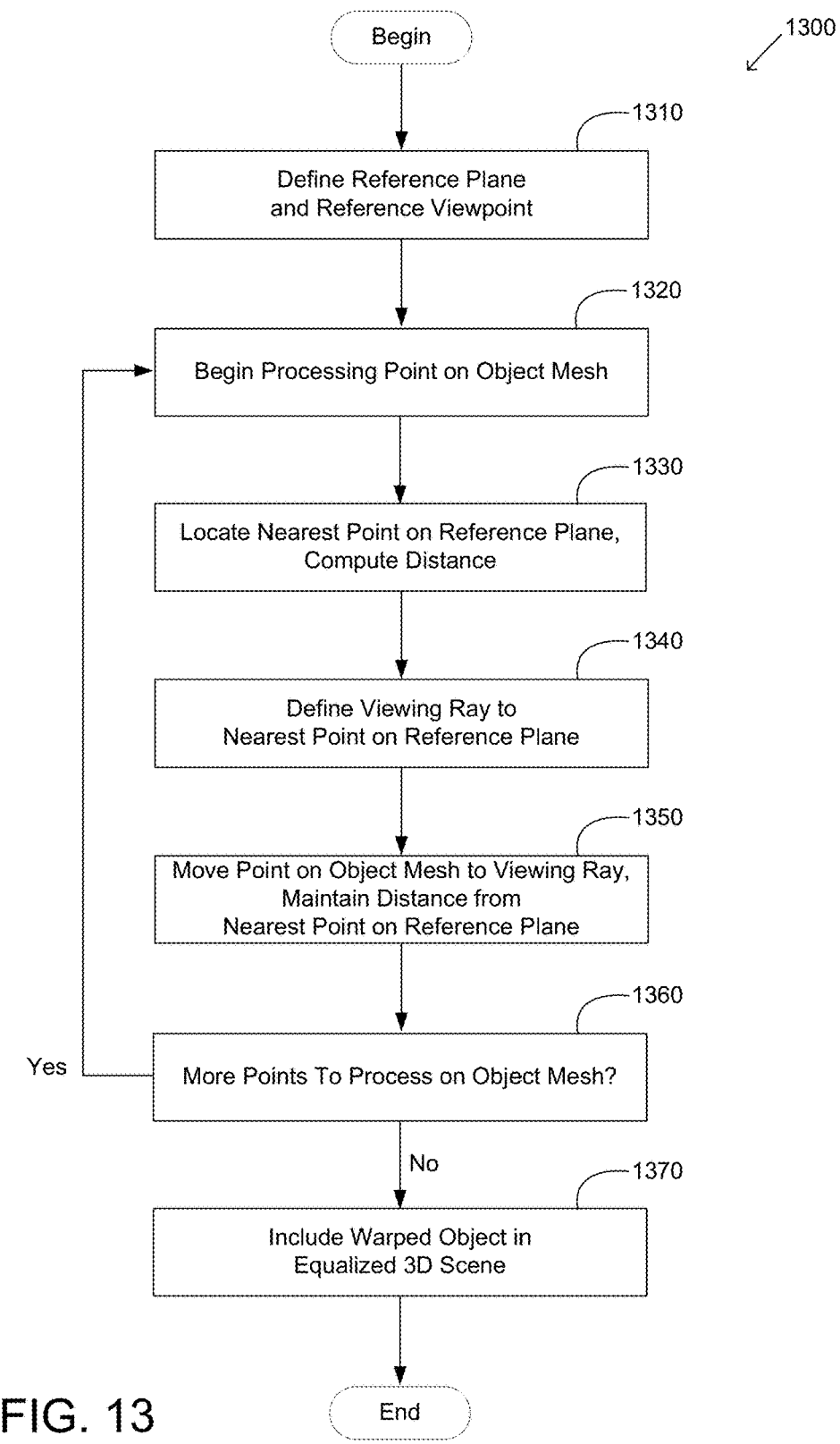
FIG. 13 illustrates an exemplary process for warping a virtual 3D object for distortion compensation, in accordance with some embodiments.

Warping of a virtual game component in a virtual 3D model to maintain the designated front perspective view of the virtual game component in the view from the virtual 3D camera may be performed in any suitable way. In some embodiments, where the virtual game component is defined as an object mesh in the virtual 3D model, the object mesh may be warped in any suitable manner that maintains the designated front perspective view of the object in the view from the virtual 3D camera. One non-limiting exemplary process for performing such object warping for distortion compensation is illustrated in FIG. 13, and its application to the example cube 1810 of FIG. 12A is illustrated in FIGS. 12B-12D.

At act 1310 of exemplary process 1300, a reference plane may be defined for the virtual 3D object (e.g., virtual game component) to be warped, and a reference viewpoint may be defined for controlling the warping. The reference plane may be defined proximate to the object mesh and generally perpendicular to the z-direction in the virtual 3D model, where the direction from the virtual 3D camera toward the origin position in the virtual 3D model when the 3D scene is initialized defines the z-direction in the virtual 3D model. In some embodiments, the reference plane may be defined as an x-y plane at the z-coordinate with respect to which the virtual 3D object's position and/or dimensions are to be fixed. This plane may intersect and form a cross-section of the virtual 3D object, or may touch an edge or surface of the virtual 3D object, or may be located proximate without actually touching the virtual 3D object. FIG. 12B shows the example cube 1810 with the reference plane (denoted in dashed lines) defined within cube 1810 and perpendicular to the z-direction (to which the front surface 1812 is also perpendicular in this example).

At act 1320 of exemplary process 1300, a point on the object mesh may be selected to begin processing. In the example of FIG. 12B, eight points are sufficient to define the corners of the cube; these are denoted by filled dots in the Figure. However, it should be appreciated that this is merely an example; any suitable number and placement of mesh points may be utilized to define a virtual 3D object, including in some cases more points than are strictly necessary to define the shape of the object. For example, further mesh points could be defined along the edges of cube 1810, and/or at any suitable location(s) on the surfaces of cube 1810, etc. In some embodiments, all of the points in the object mesh may be processed to warp the virtual 3D object, while in other embodiments, only a subset of the points may be processed for determining how to warp the object and other points may be moved by interpolation.

At act 1330 of exemplary process 1300, for each point on the object mesh selected for processing, the nearest point on the reference plane to that point on the object mesh may be located, and the distance between the point on the object mesh and the nearest point on the reference plane may be computed. In some embodiments, for example, the nearest point on the reference plane may be the point at which a line extending from the point on the object mesh perpendicular to the reference plane intersects the reference plane. For each of the eight defined points on the example object mesh of FIG. 12B, the nearest point on the reference plane is denoted in the Figure by an open dot. Exemplary distances $d_1$ and $d_2$ are marked from the top left front point on the object mesh to its nearest point on the reference plane, and from the bottom left rear point on the object mesh to its nearest point on the reference plane, respectively.

At act 1340 of exemplary process 1300, for each point on the object mesh selected for processing, a linear viewing ray may be defined connecting the reference viewpoint (defined in act 1310) and the point on the reference plane that is nearest to the point on the object mesh. Exemplary viewing rays connecting the reference viewpoint to the four open-dot points on the reference plane for the example of cube 1810 are shown in FIG. 12C. In this example, the reference viewpoint is defined at the location of the virtual 3D camera 1800. In other examples, the reference viewpoint may be defined proximate to the virtual 3D camera location without being at exactly the same point.

At act 1350 of exemplary process 1300, the virtual 3D object mesh may be warped by moving each selected point on the object mesh to a location on its corresponding defined viewing ray, while maintaining the same distance between the point on the object mesh in its new location and the nearest point on the reference plane located previously in act 1330. FIG. 12D illustrates the example cube 1810 after its object mesh has been warped by moving each of the eight filled-dot points of the object mesh onto its corresponding viewing ray while maintaining its distance (e.g., $d_1$, $d_2$, etc.) from its corresponding nearest open-dot point on the reference plane. At act 1360, a determination may be made as to whether there are more points on the object mesh remaining to be processed, and if so, the process 1300 may loop back to act 1320 to begin processing the next point on the object mesh. If there are no further points to be processed at act 1360, then the process 1300 may end at act 1370, at which the warped object may be included in an equalized 3D scene in which distortions from angled perspective viewing have been compensated for by the object warping.

Figure 14A:
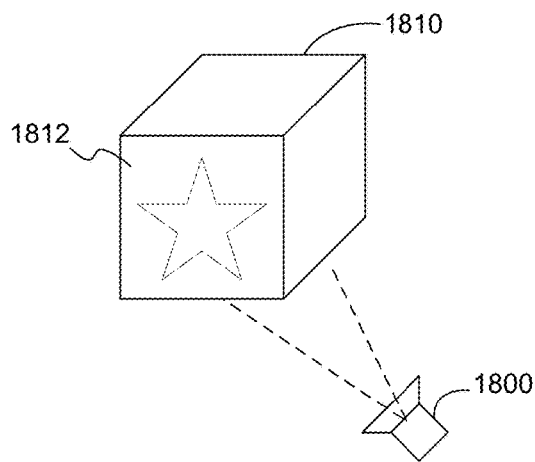
FIGS. 14A and 14B illustrate an exemplary virtual 3D object before and after warping for distortion compensation, in accordance with some embodiments.
Figure 14B:
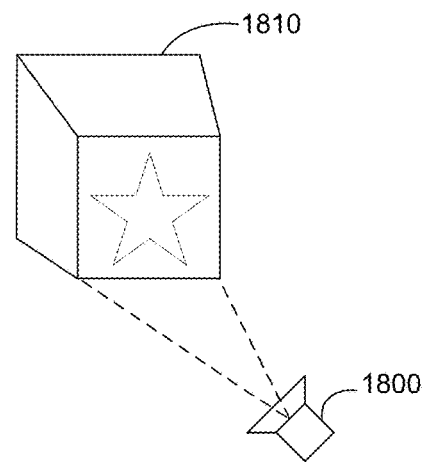

FIGS. 14A and 14B illustrate the example cube 1810 before (FIG. 14A) and after (FIG. 14B) the application of exemplary object warping process 1300 for distortion compensation. Whereas in FIG. 14A the cube 1810 is viewed from the virtual 3D camera 1800 at a perspective other than the designated front perspective, in FIG. 14B the virtual 3D object has been warped such that the designated front perspective view (i.e., the front surface 1812, as depicted in FIG. 10B) is now in the view from the virtual 3D camera 1800. In some embodiments, as illustrated in this example, the shape of the virtual 3D object may be changed when it is warped to maintain its designated front perspective view in the view from the virtual 3D camera. For instance, the virtual 3D object 1810 that was a cube in the example of FIG. 14A is no longer a cube in FIG. 14B, but rather conforms to the shape of a viewing frustum from the reference viewpoint at virtual 3D camera 1800. However, in some embodiments, the conforming of the object shape to the viewing frustum may cause the change in the object's shape to be imperceptible to the player. To the player, it may appear as if the object has retained its previous shape but only its orientation has been maintained in a direction that presents the designated front perspective view to the player.

Figure 15A:
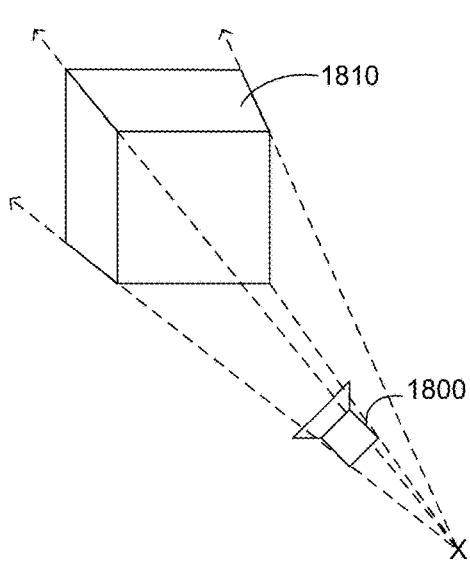
FIGS. 15A and 15B illustrate examples of adjusting an equalization level, in accordance with some embodiments.
Figure 15B:
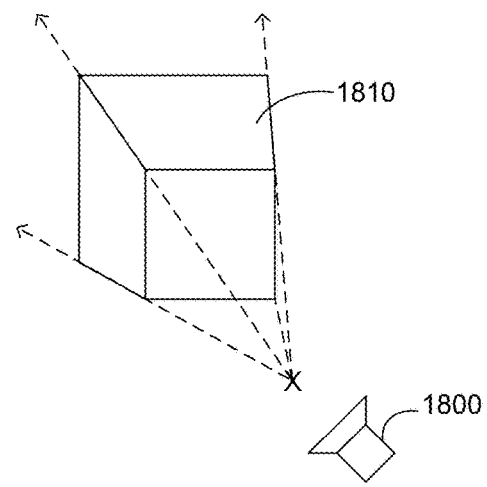

In some embodiments, an equalization level may be adjusted by moving the defined reference viewpoint away from the virtual 3D camera location. In some embodiments, the reference viewpoint may be moved along a line connecting the virtual 3D camera and the virtual game component being equalized (e.g., being warped for distortion compensation). FIG. 15A shows an example where the reference viewpoint (denoted by an "x" in the Figure) has been moved farther away from the virtual game component 1810 than the virtual 3D camera 1800 is, along a line connecting the virtual 3D camera 1800 and the virtual game component 1810. In some embodiments, the linear viewing ray for each point defined on the virtual game component's object mesh may then be re-defined based on the moved reference viewpoint, and the object mesh may be re-warped using the re-defined linear viewing rays. In the example of FIG. 15A, when the linear viewing rays are re-defined based on the reference viewpoint being farther away from the virtual game component 1810 than the virtual 3D camera 1800 is, the angles between the viewing rays re-defined from the moved reference viewpoint become smaller, and the difference in area between the equalized front surface and rear surface of cube 1810 becomes smaller. If the reference viewpoint were to be moved infinitely far away behind virtual 3D camera 1800, the viewing rays would approach parallel, and the virtual game component 1810 would return to cubic shape, but oriented with its designated front surface 1812 facing virtual 3D camera 1800 instead of angled away from it. Conversely, FIG. 15B shows an example where the reference viewpoint has been moved closer to the virtual game component 1810 than the virtual 3D camera 1800 is, along the line connecting the virtual 3D camera 1800 and the virtual game component 1810. In this case, when the linear viewing rays are re-defined based on the reference viewpoint being closer to the virtual game component 1810 than the virtual 3D camera 1800 is, the angles between the viewing rays re-defined from the moved reference viewpoint become larger, and the difference in area between the equalized front surface and rear surface of cube 1810 becomes larger. In some embodiments, one or more player-operated controls (e.g., buttons, sliders, etc.) may be provided to receive player input to adjust the equalization level. In some embodiments, as illustrated by these examples, adjusting the equalization level by moving the reference viewpoint away from the virtual 3D camera location may cause the virtual object's shape to no longer conform to the viewing frustum from the virtual 3D camera.

Figure 16A:
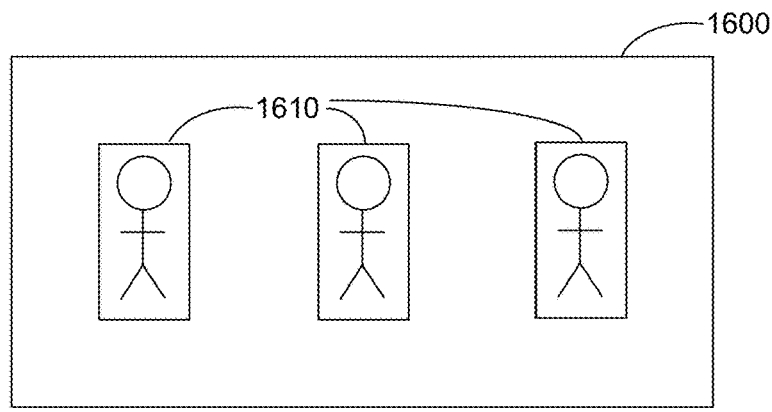

In some embodiments, as described above, a virtual game component may have a designated front surface to which a 2D image is assigned, and its designated front perspective view may be one in which the 2D image is seen undistorted (with the possible exception of uniform scaling) from its shape and/or aspect ratio in its 2D form. In some such embodiments, distortion of the 2D image in the view of the virtual 3D model from the virtual 3D camera may be prevented by maintaining the designated front perspective view of the virtual game component in the view from the virtual 3D camera. For instance, FIG. 16A illustrates an example in which a virtual 3D model for a wagering game includes a background plane 1600 (e.g., representing a game board or other background) and three rectangular virtual game components 1610 each representing a playing piece with the image of a figure assigned to its front surface. In the example of FIG. 16A, the virtual 3D camera 1800 is located directly in front of the middle virtual game component 1610, and views the left and right virtual game components 1610 from an angle.

Figure 16B:
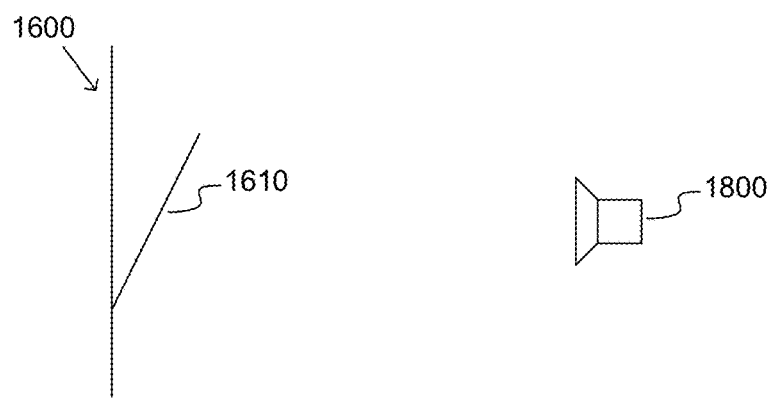

In some embodiments, generating the 3D scene for the wagering game may include tilting the front surface of a virtual game component in the z-direction toward the virtual 3D camera, so as to provide the perception of depth (e.g., parallax) between the virtual game component and a background behind the virtual game component in the virtual 3D model. FIG. 16B illustrates an example cross-sectional side view of the background plane 1600 and virtual game component 1610 from FIG. 16A, with the virtual game component 1610 (which in this example is a substantially planar rectangular playing piece) tilted forward toward virtual 3D camera 1800 from the background plane 1600. In this example, the tilting of virtual game component 1610 creates the perception of depth between the top edge of virtual game component 1610 and the background plane 1600, such that the player perceives virtual game component 1610 as if it were standing up on the background plane 1600 (e.g., on the game board). In some embodiments, one or more player-operated controls (e.g., buttons, sliders, etc.) may be provided to receive player input to adjust the amount of tilt of the virtual game component 1610, and thus the resulting amount of perceived depth in the 3D scene. It should be appreciated that tilting a virtual game component is merely one exemplary technique for creating perceived depth in a 3D scene, and other techniques are possible. For instance, in another example, a virtual game component may be moved (alternatively or additionally to being tilted) in the z-direction away from a background plane or other component to create a perception of depth.

Figure 16D:
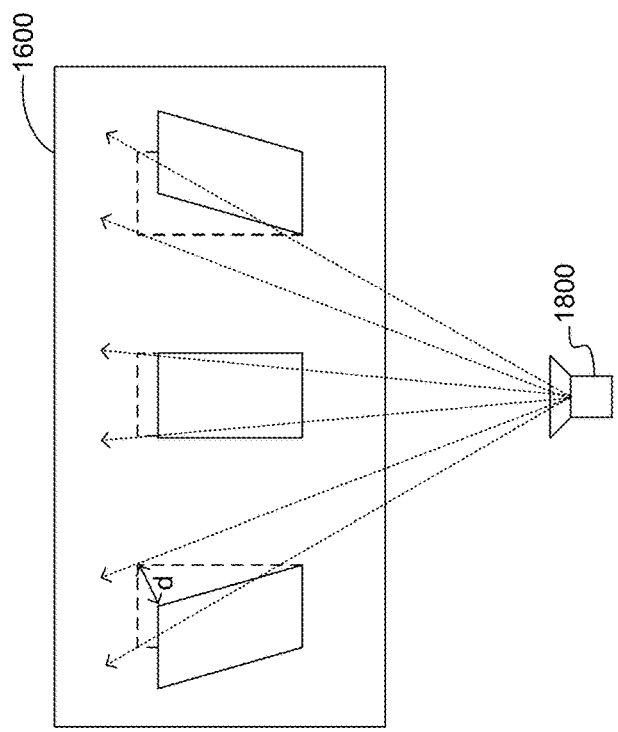
Figure 16C:
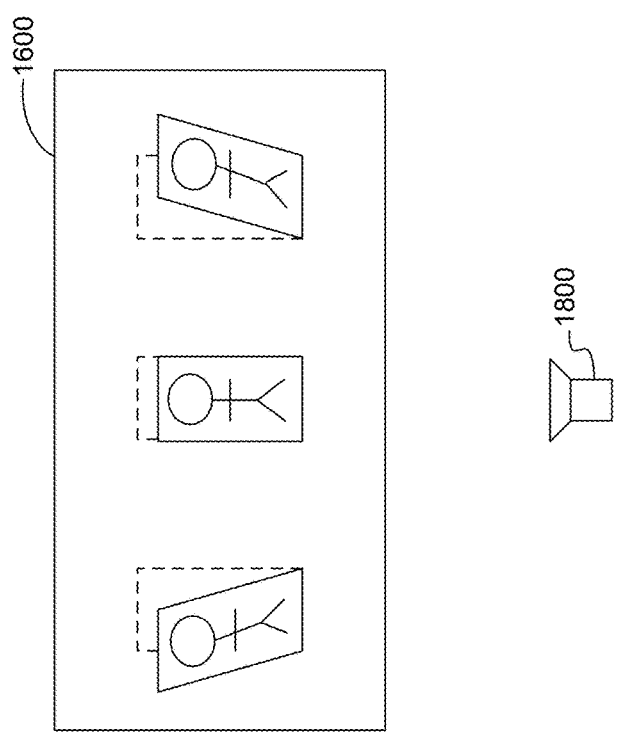

FIG. 16C illustrates an example of the resulting view of the 3D scene from virtual 3D camera 1800 when the three exemplary virtual game components 1610 are tilted forward (i.e., in the z-direction) in the virtual 3D model. As illustrated in FIG. 16C, the virtual 3D camera 1800 no longer sees the designated front perspective view of each virtual game component 1800, as the 3D tilting creates an angular offset such that the 2D images on the front surfaces of the virtual game components 1610 appear distorted in the view from the virtual 3D camera. For example, the right and left virtual game components 1610 appear slanted because of the angle from which they are viewed from virtual 3D camera 1800.

In some embodiments, such distortion may be compensated by warping the object mesh of a virtual game component to maintain its designated front perspective view in the view from the virtual 3D camera. In some embodiments, the distortion compensation may be performed automatically when the degree of tilt of a virtual game component is adjusted, such that the designated front perspective view of the virtual game component is maintained in the view from the virtual 3D camera while adjusting the tilt of the virtual game component. FIG. 16D illustrates an example in which the exemplary process of FIG. 13 is performed to warp the object mesh of each virtual game component 1610 to maintain its designated front perspective view in the view from virtual 3D camera 1800. In this example, the background plane 1600 is defined as the reference plane (generally perpendicular to the z-direction and proximate to the virtual game components 1610), and the virtual 3D camera location 1800 is defined as the reference viewpoint. Linear viewing rays are defined connecting the reference viewpoint to the nearest point on the reference plane for each point in a defined set of points on the object mesh of each virtual game component 1610, and the distance d is computed between each point on the object mesh and its nearest point on the reference plane. In FIG. 16E is illustrated how the object mesh of each virtual game component 1610 is warped by moving each point on the object mesh to a location on the corresponding viewing ray while maintaining the distance d between that point on the object mesh and the nearest point on the reference plane. The result in FIG. 16E is that the designated front perspective view of each virtual game component 1610 is now maintained in the view from the virtual 3D camera 1800 by warping the designated front surface of the virtual game component 1610 into the viewing frustum between the viewing rays.

In some embodiments, as discussed above, an equalization level of a virtual game component may be made adjustable by moving the reference viewpoint to locations other than proximate to the virtual 3D camera location. For example, as discussed above, in some embodiments the reference viewpoint may be moved along a line connecting the virtual 3D camera and the virtual game component, the linear viewing rays may be re-defined based on the moved reference viewpoint, and the object mesh of the virtual game component may be re-warped using the re-defined linear viewing rays based on the moved reference viewpoint. In some embodiments where there are multiple virtual game components in the virtual 3D model for a wagering game, such as in the example of FIG. 16, different virtual game components may have different defined reference viewpoints. In some embodiments, for example, each virtual game component of two or more virtual game components may have its own reference viewpoint, and the reference viewpoint belonging to a particular virtual game component may be moved along a line connecting the virtual 3D camera and that particular virtual game component. As such, in some embodiments, the equalization level of each particular virtual game component may be individually adjustable by moving the reference viewpoint for that particular virtual game component along the line connecting that particular virtual game component and the virtual 3D camera. In some embodiments, the equalization level in the 3D scene as a whole may be adjusted by moving the different reference viewpoints for the different virtual game components together (e.g., such that all of the reference viewpoints are at the same distance from the virtual 3D camera along their respective lines at the same time). In some embodiments, this adjustment of the equalization level in a 3D scene may be performed in accordance with player input received via one or more player-operated controls for the equalization level. In some other embodiments, a player may be allowed to control the equalization of different virtual game components independently. In some embodiments, control of the equalization level may be tied to control of the degree of tilt of a virtual game component, such that adjustment of the degree of tilt causes automatic corresponding adjustment to the equalization level.

Figure 17:
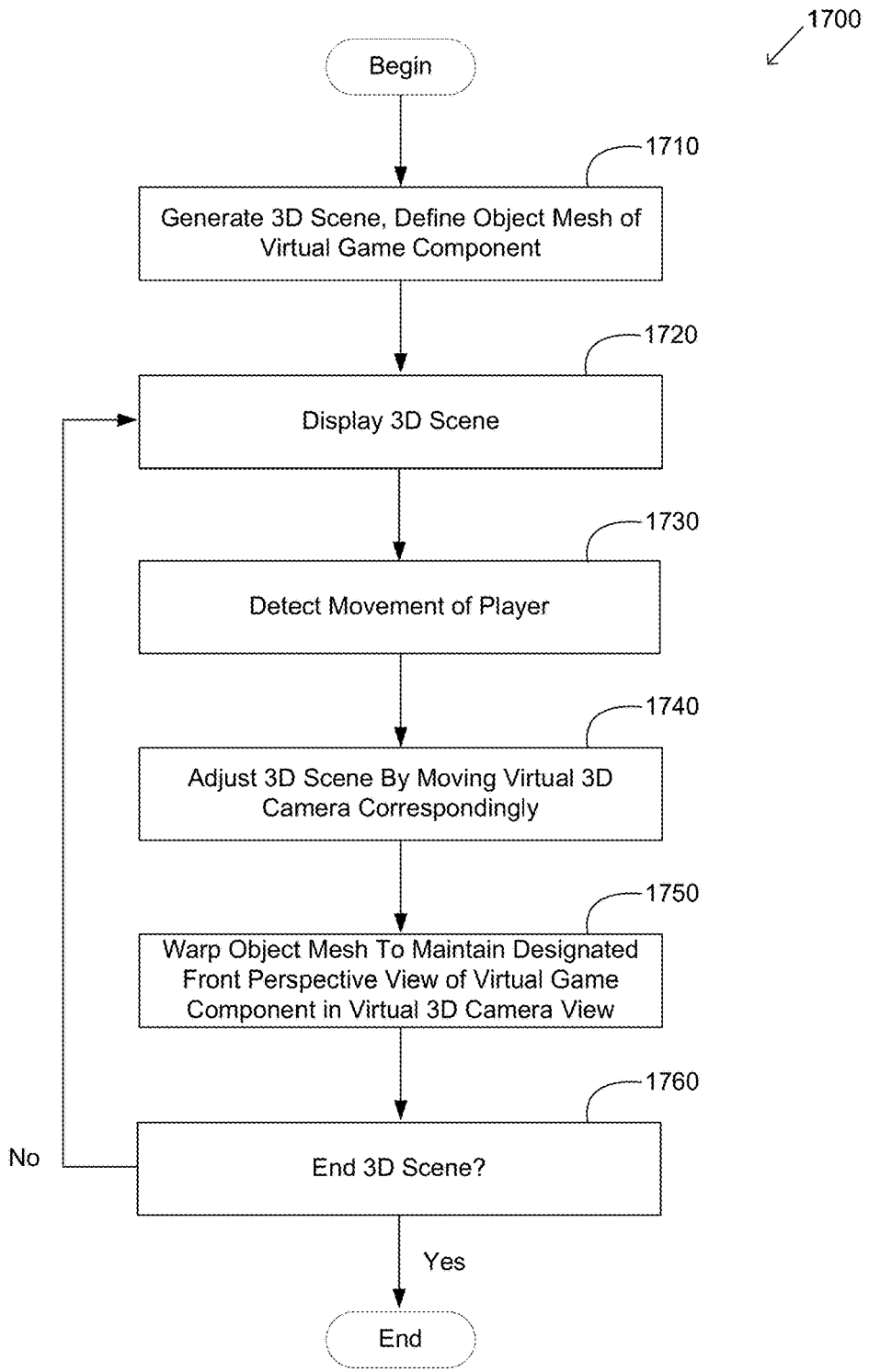
FIG. 17 illustrates an exemplary 3D display process, in accordance with some embodiments.

In some embodiments, processing may be performed to compensate for distortion that may be caused by movement of the virtual 3D camera within the virtual 3D model (e.g., updating the display to track movement of the player in front of the wagering gaming apparatus, as described above). FIG. 17 illustrates an exemplary 3D display process 1700 in which such distortion compensation may be performed. Exemplary process 1700 may be performed, for example, by a wagering gaming apparatus having a 3D display device configured to create for a player a visual illusion of a 3D scene for a wagering game. The wagering gaming apparatus may further include one or more processors and one or more storage media storing instructions executed by the processor(s) to perform the process 1700.

At act 1710 of exemplary process 1700, a 3D scene may be generated, e.g., as a view from a virtual 3D camera toward an origin position in a virtual 3D model. This may include defining a virtual game component as an object mesh in the virtual 3D model, with the virtual game component having a designated front perspective view, as discussed above. Examples of generation of such 3D scenes with such virtual game components are described above. At act 1720, the 3D scene may be displayed, e.g., via the 3D display device of the wagering gaming apparatus.

At act 1730 of exemplary process 1700, movement of the player in front of the wagering gaming apparatus's physical screen may be detected. As discussed above, such player movement may be detected in any suitable way, such as by tracking one or more anatomical features of the player, such as the player's head and/or eye(s). At act 1740, in response to the movement of the player in front of the physical screen, the 3D scene may be adjusted by moving the virtual 3D camera correspondingly within the virtual 3D model. Examples of how the virtual 3D camera may be moved in response to tracking player movement are described above. At act 1750, the object mesh of the virtual game component may be warped in conjunction with moving the virtual 3D camera, thereby maintaining the designated front perspective view of the virtual game component in the view from the virtual 3D camera despite its movement. Examples of how such warping may be performed are described above.

At act 1760 of exemplary process 1700, a determination may be made as to whether the 3D scene is to be ended (e.g., if the wagering game is ending, or if the wagering game is progressing to a different 3D scene, etc.). As long as the 3D scene is to be continued, exemplary process 1700 may loop back to act 1720 displaying the 3D scene, and further movements of the player may be detected to cause the virtual 3D camera to move and the distortion compensation to be applied to the object mesh of the virtual game component correspondingly as the player moves. When it is determined that the 3D scene is to end at act 1760, then exemplary process 1700 may end (and a next 3D scene display process may possibly begin).

It should be appreciated that techniques described herein may be used in the 3D display of any suitable wagering game or other type of 3D display, and applied to any suitable type and/or configuration of virtual object(s), such as virtual game components or any other suitable virtual objects. While some specific examples of applications of techniques described herein to particular wagering game scenarios are described below, these are provided merely for purposes of illustration and are not intended to be limiting for all embodiments.

In one exemplary application, as described in detail above, a virtual game component represented by a 3D virtual object may be warped to maintain its designated front perspective view in the view from the virtual 3D camera. One particular such example may be a virtual game component representing a jewel/gem that moves within a 3D space in a wagering game, but should have its designated front perspective view maintained in the player's view. Another example, as described above, may be a virtual game component representing a playing piece, a card, etc., having a 2D image assigned to a designated front surface. In some embodiments, the designated front perspective view in which the 2D image is undistorted (other than possibly uniform scaling) may be maintained in the view from the virtual 3D camera while the playing piece, card, etc., is moved within the 3D space. In another example, a virtual game component representing text (e.g., a logo, message, etc.) may be warped to maintain its 2D font and/or font effects without distortion in the view from the virtual 3D camera despite movement of the virtual game component and/or the virtual 3D camera.

In another exemplary application, a virtual game component representing a wheel of fortune may be warped to maintain its designated front perspective view and avoid a fish-eye effect when the wheel is moved closer to the virtual 3D camera. In another exemplary application, virtual game components representing coins in a 3D coin flight may be warped so that the designated front perspective view of each coin is maintained in the view from the virtual 3D camera, and/or so that each coin does not appear to grow in size outside of a particular viewing frustum as the coin moves closer to the virtual 3D camera. In some embodiments, such warping to control the growth in size of virtual game component moving closer to the virtual 3D camera may be performed by fixing the reference plane in the warping process at a location that is not necessarily proximate to the virtual game component. This may be desirable, for example, to prevent closer virtual objects from appearing so large as to overlap and obscure farther away virtual objects in the 3D scene presented to the player.

In another such example, virtual game components representing symbols on a reel in a reel-spinning game (e.g., a slots game) may be warped in an animation where the symbols detach from the reel and move closer to the virtual 3D camera, to prevent perspective distortion and/or to prevent the moving symbols from appearing too large and obscuring neighboring elements in the 3D scene. In yet another example, a virtual game component representing a win border that is overlaid on a reel symbol may be warped such that its dimensions appear to conform with the symbol border even when the win border is moved closer to the virtual 3D camera.

In any of the foregoing examples, it should be appreciated that when the reference viewpoint for the object warping process is defined proximate to the virtual 3D camera location, the object warping may have the benefit of avoiding visual clipping of the 3D object, since the equalized object is confined within the defined viewing frustum.

It should be appreciated that the various concepts disclosed above may be implemented in any of numerous ways, as the concepts are not limited to any particular manner of implementation. For instance, the present disclosure is not limited to the particular arrangements of components shown in the various figures, as other arrangements may also be suitable. Such examples of specific implementations and applications are provided solely for illustrative purposes.

Figure 7:
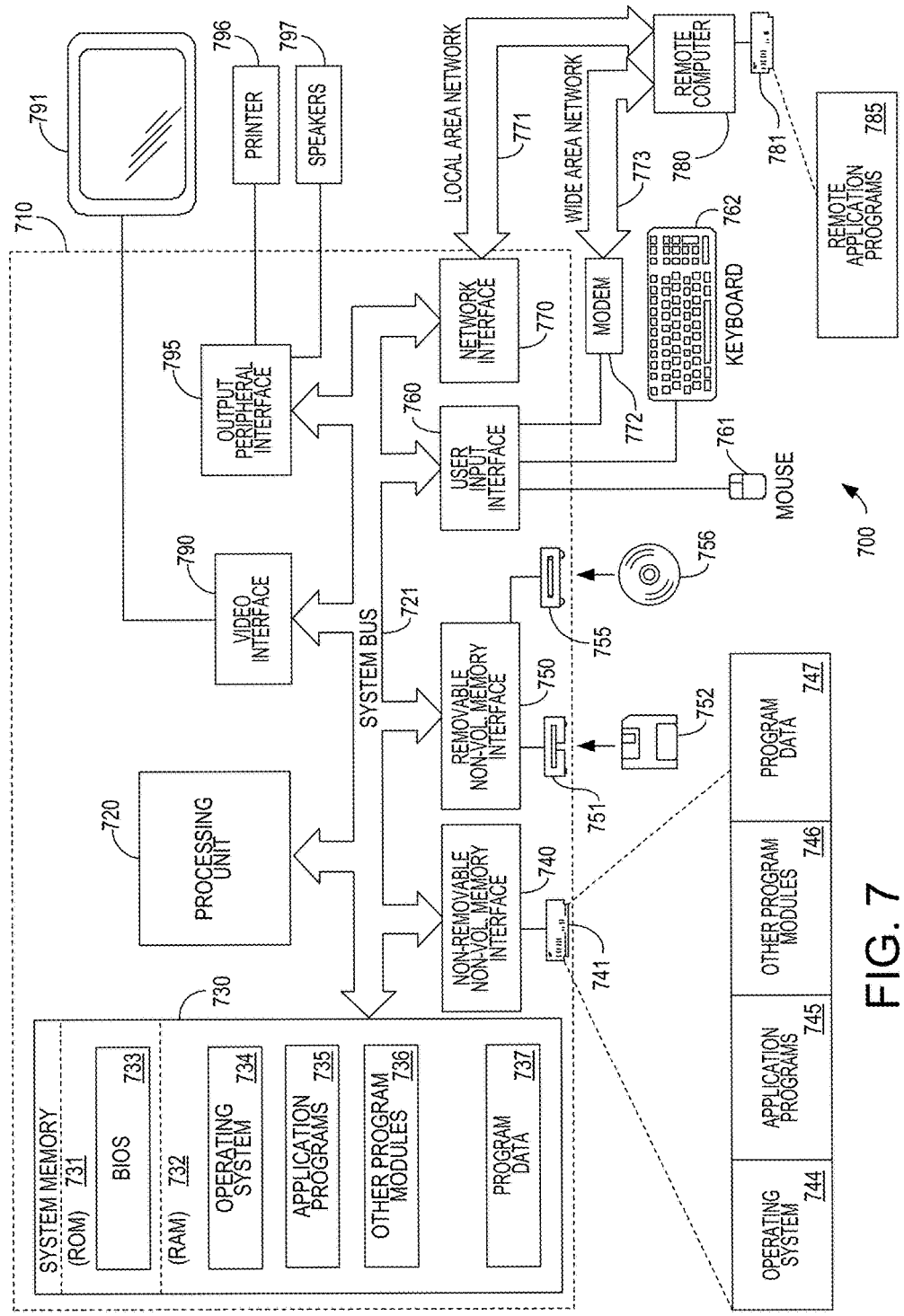
FIG. 7 is a block diagram illustrating an exemplary computing system environment in which various inventive aspects of the present disclosure may be implemented.

FIG. 7 shows an illustrative example of a computing system environment 700 in which various inventive aspects of the present disclosure may be implemented. This computing system may be representative of a computing system that allows a suitable control system to implement the described techniques. However, it should be appreciated that the computing system environment 700 is only one example of a suitable computing environment and is not intended to suggest any limitation as to the scope of use or functionality of the described embodiments. Neither should the computing environment 700 be interpreted as having any dependency or requirement relating to any one or combination of components illustrated in the illustrative operating environment 700.

The embodiments are operational with numerous other computing system environments or configurations. Examples of computing systems, environments, and/or configurations that may be suitable for use with the described techniques include, but are not limited to, personal computers, server computers, hand-held or laptop devices, multi-processor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc., that perform particular tasks or implement particular abstract data types. The embodiments may also be practiced in distributed computing environments where tasks are performed by remote processing devices that are linked through a communications network. In a distributed computing environment, program modules may be located in both local and remote computer storage media including memory storage devices.

With reference to FIG. 7, an illustrative system for implementing the described techniques includes a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the illustrative operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7 provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 710 through input devices such as a keyboard 762 and pointing device 761, commonly referred to as a mouse, trackball or touch pad. Other input devices (not shown) may include a microphone, joystick, game pad, satellite dish, scanner, touchscreen, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are illustrative and other means of establishing a communications link between the computers may be used.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with one or more processors that is programmed using microcode or software to perform the functions recited above.

In this respect, it should be appreciated that one implementation comprises at least one processor-readable storage medium (i.e., at least one tangible, non-transitory processor-readable medium, e.g., a computer memory (e.g., hard drive, flash memory, processor working memory, etc.), a floppy disk, an optical disc, a magnetic tape, or other tangible, non-transitory computer-readable medium) encoded with a computer program (i.e., a plurality of instructions), which, when executed on one or more processors, performs at least the above-discussed functions. The processor-readable storage medium can be transportable such that the program stored thereon can be loaded onto any computer resource to implement functionality discussed herein. In addition, it should be appreciated that the reference to a computer program which, when executed, performs above-discussed functions, is not limited to an application program running on a host computer. Rather, the term "computer program" is used herein in a generic sense to reference any type of computer code (e.g., software or microcode) that can be employed to program one or more processors to implement above-discussed functionality.

The phraseology and terminology used herein is for the purpose of description and should not be regarded as limiting. The use of "including," "comprising," "having," "containing," "involving," and variations thereof, is meant to encompass the items listed thereafter and additional items. Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described several embodiments of the invention, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A wagering gaming apparatus comprising:
   a 3-dimensional (3D) display device to create for a player a visual illusion of a 3D scene for a wagering game, the 3D scene comprising perceived depth in a z-direction perpendicular to a physical screen comprising width in an x-direction and height in a y-direction;
   a processor circuit; and
   a non-transitory processor-readable storage medium storing processor-executable instructions that, when executed by the processor circuit, cause the processor circuit to perform:
      generating the 3D scene as a view from a virtual 3D camera toward an origin position in a virtual 3D model, the generating comprising defining a virtual game component as an object mesh in the virtual 3D model, the virtual game component comprising a designated front perspective view;
      displaying the generated 3D scene via the 3D display device;
      detecting a first position of an anatomical feature of the player in front of the physical screen;
      detecting a movement of the anatomical feature of the player from the first position in front of the physical screen to a second position in front of the physical screen;
      in response to movement of the anatomical feature of the player in front of the physical screen, adjusting the 3D scene by moving the virtual 3D camera within the virtual 3D model; and
      maintaining the designated front perspective view of the virtual game component in the view from the virtual 3D camera by warping the object mesh in conjunction with moving the virtual 3D camera,
   wherein maintaining the designated front perspective view of the virtual game component in the view from the virtual 3D camera comprises:
      defining a set of points on the object mesh, defining a reference plane proximate to the object mesh and generally perpendicular to the z-direction in the virtual 3D model, and defining a reference viewpoint proximate to the virtual 3D camera; and
      for each point in the defined set of points on the object mesh:
         determining a nearest point on the reference plane and a distance from the point on the object mesh to the nearest point on the reference plane,
         defining a linear viewing ray connecting the reference viewpoint and the nearest point on the reference plane, and
         warping the object mesh by moving the point on the object mesh to a location on the viewing ray while maintaining the distance from the point on the object mesh to the nearest point on the reference plane.

2. The wagering gaming apparatus of claim 1, wherein the designated front perspective view of the virtual game component comprises a 2-dimensional (2D) image assigned to a front surface of the virtual game component, wherein maintaining the designated front perspective view of the virtual game component in the view from the virtual 3D camera comprises preventing distortion of the 2D image in the view from the virtual 3D camera by warping the object mesh in conjunction with moving the virtual 3D camera.

3. The wagering gaming apparatus of claim 2, wherein generating the 3D scene comprises tilting the front surface of the virtual game component in the z-direction toward the virtual 3D camera.

4. The wagering gaming apparatus of claim 3, wherein the processor-executable instructions further cause the processor circuit to adjust the tilt of the virtual game component in accordance player input received via a player-operated control.

5. The wagering gaming apparatus of claim 4, wherein the processor-executable instructions further cause the processor circuit to maintain the designated front perspective view of the virtual game component in the view from the virtual 3D camera while adjusting the tilt of the virtual game component.

6. The wagering gaming apparatus of claim 1, wherein the processor-executable instructions further cause the processor circuit to adjust an equalization level of the virtual game component by:
   moving the reference viewpoint along a line connecting the virtual 3D camera and the virtual game component;
   re-defining the linear viewing ray for each point in the defined set of points on the object mesh based on the moved reference viewpoint; and
   re-warping the object mesh using the re-defined linear viewing rays based on the moved reference viewpoint.

7. A method in a wagering gaming system comprising a 3-dimensional (3D) display device to create for a player a visual illusion of a 3D scene for a wagering game, the 3D scene comprising perceived depth in a z-direction perpendicular to a physical screen comprising width in an x-direction and height in a y-direction, the method comprising:
   generating the 3D scene as a view from a virtual 3D camera toward an origin position in a virtual 3D model, the generating comprising defining a virtual game component as an object mesh in the virtual 3D model, the virtual game component comprising a designated front perspective view;

displaying the generated 3D scene via the 3D display device;

detecting a first position of an anatomical feature of the player in front of the physical screen;

detecting a movement of the anatomical feature of the player from the first position in front of the physical screen to a second position in front of the physical screen;

in response to movement of the anatomical feature of the player in front of the physical screen, adjusting the 3D scene by moving the virtual 3D camera within the virtual 3D model; and maintaining the designated front perspective view of the virtual game component in the view from the virtual 3D camera by warping the object mesh in conjunction with moving the virtual 3D camera;

wherein maintaining the designated front perspective view of the virtual game component in the view from the virtual 3D camera comprises:

defining a set of points on the object mesh, defining a reference plane proximate to the object mesh and generally perpendicular to the z-direction in the virtual 3D model, and defining a reference viewpoint proximate to the virtual 3D camera; and for each point in the defined set of points on the object mesh:

determining a nearest point on the reference plane and a distance from the point on the object mesh to the nearest point on the reference plane, defining a linear viewing ray connecting the reference viewpoint and the nearest point on the reference plane, and warping the object mesh by moving the point on the object mesh to a location on the viewing ray while maintaining the distance from the point on the object mesh to the nearest point on the reference plane.

8. The method of claim 7, wherein the designated front perspective view of the virtual game component comprises a 2-dimensional (2D) image assigned to a front surface of the virtual game component, wherein maintaining the designated front perspective view of the virtual game component in the view from the virtual 3D camera comprises preventing distortion of the 2D image in the view from the virtual 3D camera by warping the object mesh in conjunction with moving the virtual 3D camera.

9. The method of claim 8, wherein generating the 3D scene comprises tilting the front surface of the virtual game component in the z-direction toward the virtual 3D camera.

10. The method of claim 9, further comprising adjusting the tilt of the virtual game component in accordance player input received via a player-operated control.

11. The method of claim 10, further comprising maintaining the designated front perspective view of the virtual game component in the view from the virtual 3D camera while adjusting the tilt of the virtual game component.

12. The method of claim 7, further comprising adjusting an equalization level of the virtual game component by:

moving the reference viewpoint along a line connecting the virtual 3D camera and the virtual game component;

re-defining the linear viewing ray for each point in the defined set of points on the object mesh based on the moved reference viewpoint; and re-warping the object mesh using the re-defined linear viewing rays based on the moved reference viewpoint.

13. The wagering gaming apparatus of claim 1, wherein detecting the movement of the anatomical feature of the player in front of the physical screen comprises detecting a movement of a head of the player in front of the physical screen.

14. The wagering gaming apparatus of claim 1, wherein detecting the movement of the anatomical feature of the player in front of the physical screen comprises detecting a movement of an eye of the player in front of the physical screen.

15. The method of claim 7, wherein detecting the movement of the anatomical feature of the player in front of the physical screen comprises detecting a movement of a head of the player in front of the physical screen.

16. The method of claim 7, wherein detecting the movement of the anatomical feature of the player in front of the physical screen comprises detecting a movement of an eye of the player in front of the physical screen.

* * * * *